United States Patent
Esaka et al.

(10) Patent No.: US 11,836,381 B2
(45) Date of Patent: Dec. 5, 2023

(54) MEMORY SYSTEM AND METHOD OF CONTROLLING NONVOLATILE MEMORY USING NAMESPACE ATTRIBUTES

(71) Applicant: Kioxia Corporation, Tokyo (JP)

(72) Inventors: Naoki Esaka, Kanagawa (JP); Shinichi Kanno, Tokyo (JP)

(73) Assignee: Kioxia Corporation, Tokyo (JP)

( * ) Notice: Subject to any disclaimer, the term of this patent is extended or adjusted under 35 U.S.C. 154(b) by 150 days.

(21) Appl. No.: 17/473,634

(22) Filed: Sep. 13, 2021

(65) Prior Publication Data

US 2022/0236916 A1 Jul. 28, 2022

(30) Foreign Application Priority Data

Jan. 27, 2021 (JP) ................................ 2021-011137

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0679; G06F 3/0616; G06F 3/0638; G06F 3/064; G06F 3/0655
See application file for complete search history.

(56) References Cited

U.S. PATENT DOCUMENTS

| | | | |
|---|---|---|---|
| 9,383,924 B1 * | 7/2016 | Fullbright | G06F 3/067 |
| 9,563,566 B2 | 2/2017 | Bahn et al. | |
| 10,474,569 B2 | 11/2019 | Kanno | |
| 2009/0271567 A1 | 10/2009 | Huang | |
| 2014/0244960 A1 * | 8/2014 | Ise | G06F 3/0685 |
| | | | 711/165 |
| 2018/0239701 A1 * | 8/2018 | Baptist | G06F 11/1076 |
| 2019/0004947 A1 * | 1/2019 | Trika | G06F 3/0647 |
| 2019/0138226 A1 * | 5/2019 | Kanno | G06F 3/0616 |
| 2019/0346902 A1 * | 11/2019 | D'Eliseo | G06F 12/0246 |
| 2019/0347015 A1 * | 11/2019 | Luo | G11C 16/3459 |
| 2019/0391747 A1 * | 12/2019 | Sheperek | G06F 3/0679 |
| 2020/0081830 A1 * | 3/2020 | Desai | G06F 12/0246 |
| 2020/0089617 A1 * | 3/2020 | Onishi | G06F 12/0246 |
| 2020/0218455 A1 | 7/2020 | Cho et al. | |
| 2021/0103518 A1 * | 4/2021 | Ju | G06F 9/3885 |

(Continued)

FOREIGN PATENT DOCUMENTS

| | | |
|---|---|---|
| CN | 106502928 A | 3/2017 |
| CN | 110825325 A | 2/2020 |
| CN | 111414313 A | 7/2020 |

(Continued)

*Primary Examiner* — Tracy A Warren
(74) *Attorney, Agent, or Firm* — Allen & Overy LLP

(57) ABSTRACT

According to one embodiment, in response to receiving a first namespace create command specifying a first attribution from a host, a controller creates a first namespace having the first attribution and a first logical address range. The first logical address range includes logical addresses. The controller sets each of the logical addresses to an unallocated state in which a physical address of the nonvolatile memory is not mapped, during a first period from a time when receiving a power loss advance notification or when detecting an unexpected power loss until a time when the controller becomes a ready state by resupply of a power to the memory system.

15 Claims, 21 Drawing Sheets

(56) References Cited

U.S. PATENT DOCUMENTS

2021/0342267 A1* 11/2021 Lam .................... G06F 12/0804
2021/0382643 A1* 12/2021 Muthiah ............... G06F 3/0616

FOREIGN PATENT DOCUMENTS

| JP | 2009-223787 A | 10/2009 |
| JP | 6320322 B2 | 5/2018 |
| TW | 200917021 A | 4/2009 |

* cited by examiner

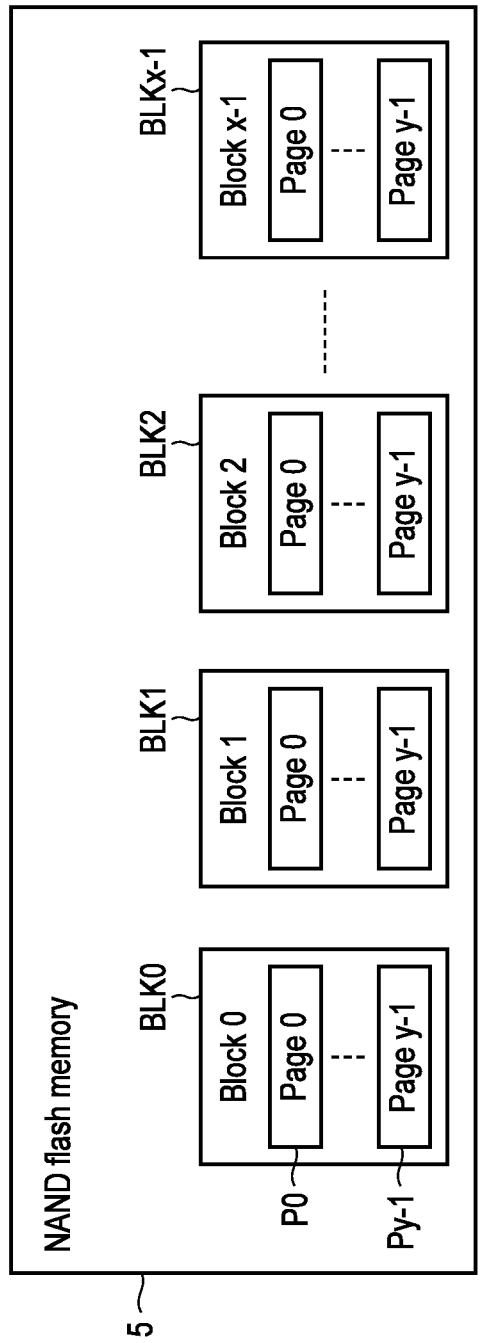
F I G. 2

| Namespace identifier | Clear identifier | Size of namespace (Number of LBAs) |
|---|---|---|
| NSID1 | 1 (clear) | j+1 |
| NSID2 | 0 (non-clear) | j+1 |
| ⋮ | ⋮ | ⋮ |
| NSIDn | 1 (clear) | k+1 |

| | | | | |
|---|---|---|---|---|
| P0 | Data,LBA16 | Data,LBA17 | Data,LBA18 | Data,LBA20 |
| P1 | Data,LBA7 | Data,LBA15 | Data,LBA5 | Data,LBA6 |
| ⋮ | | | | |
| Py-1 | Data,LBA30 | Data,LBA31 | Data,LBA32 | Data,LBA33 |

BLK1

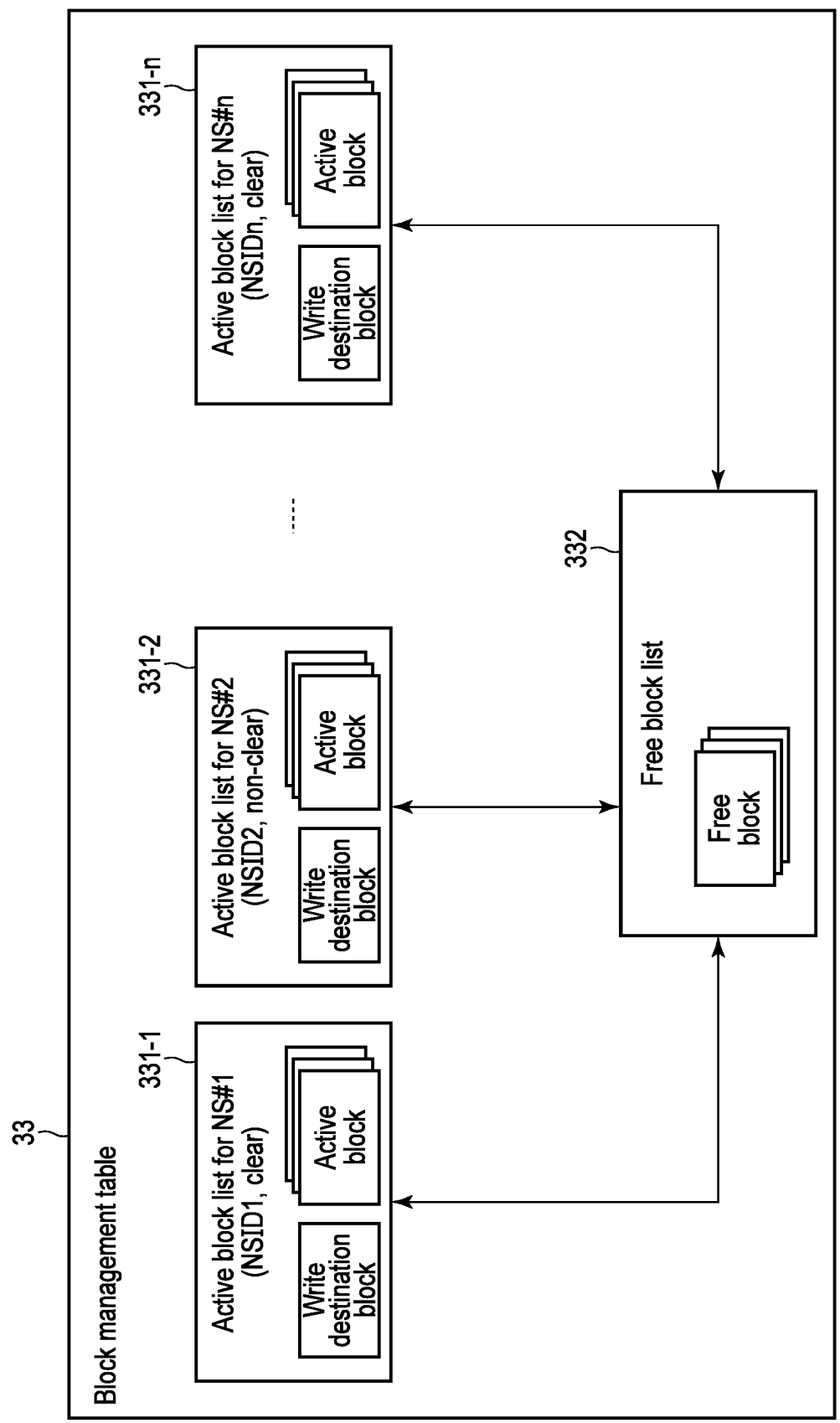
F I G. 6

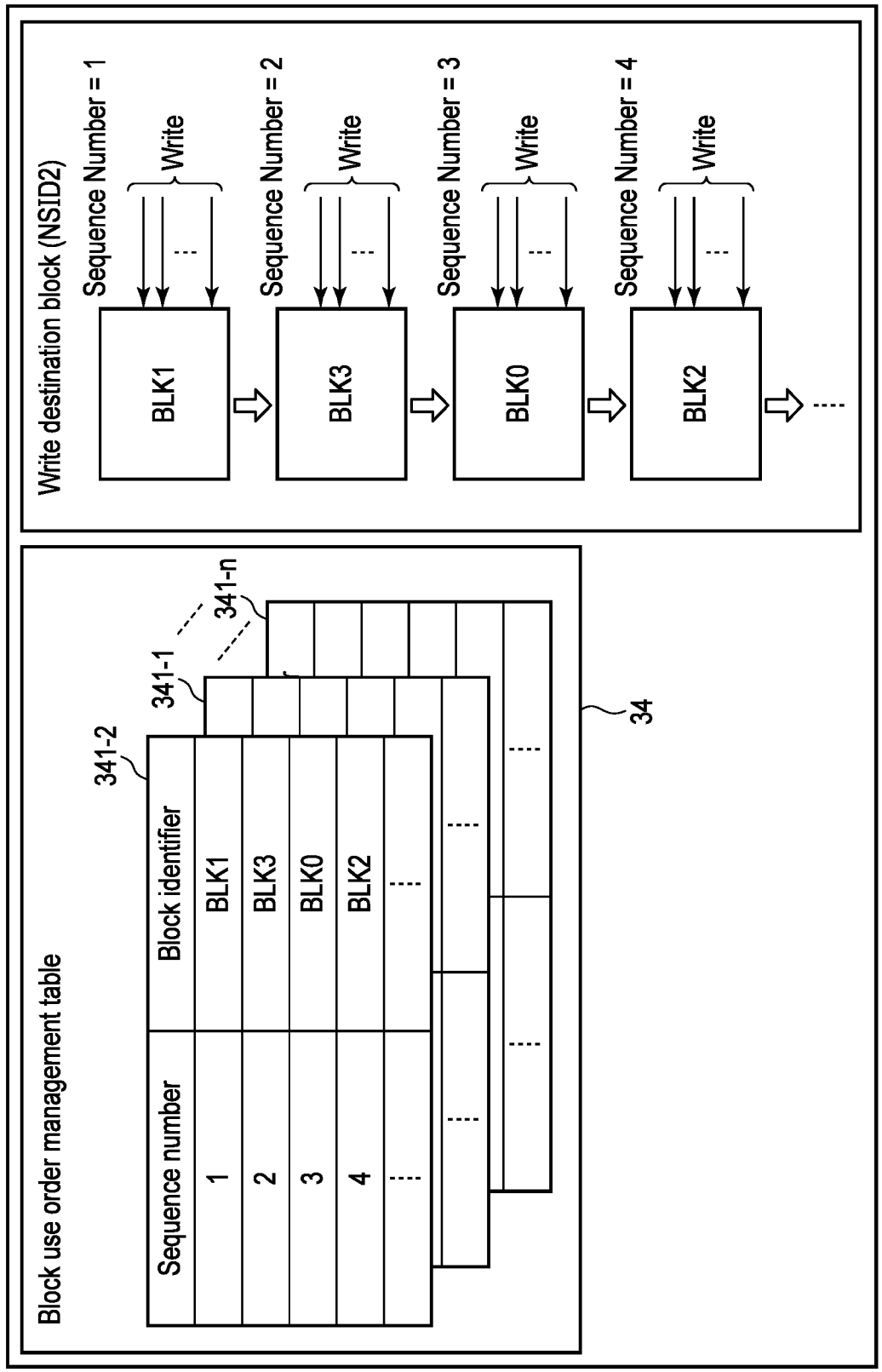
F I G. 7

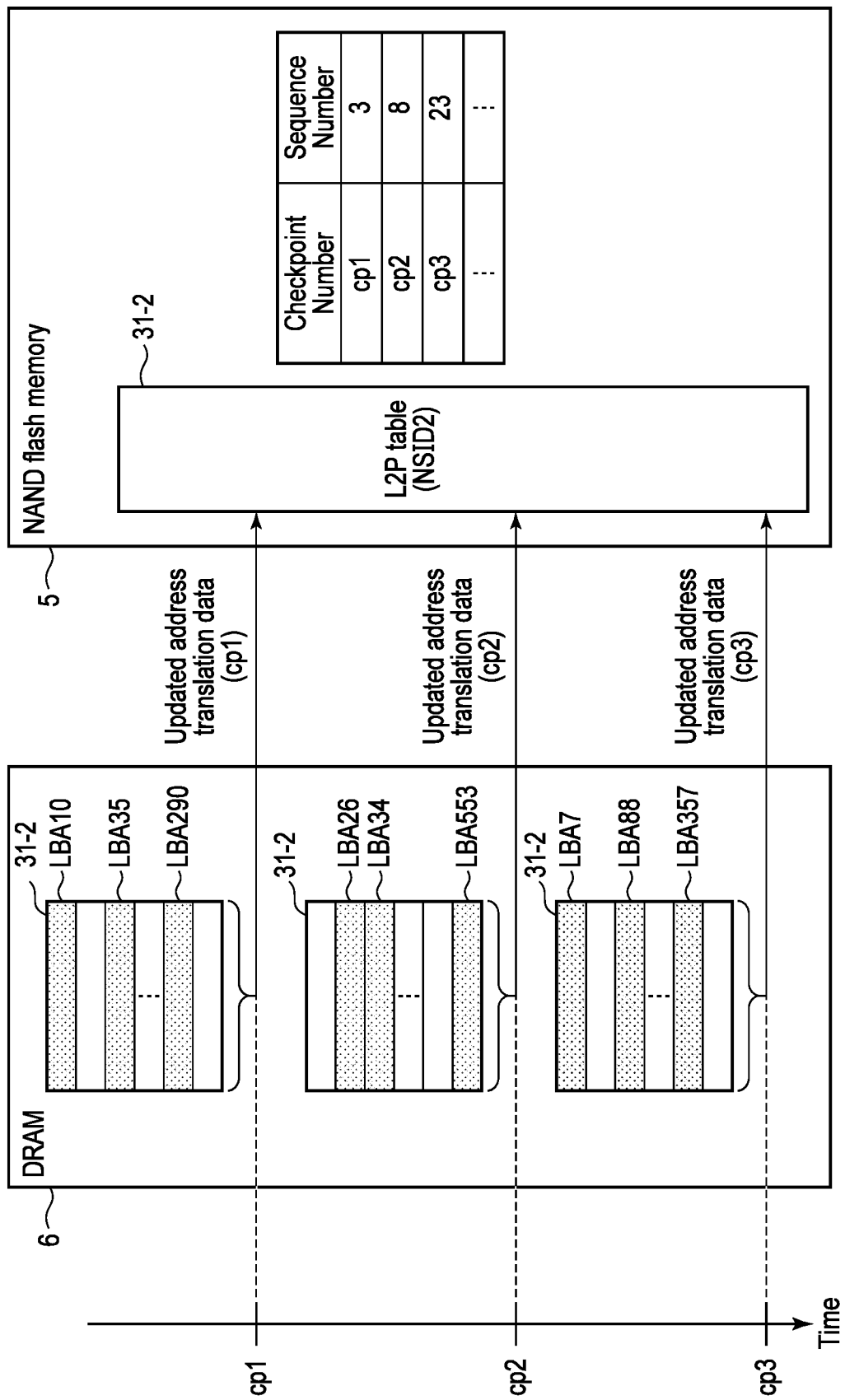
F I G. 9A

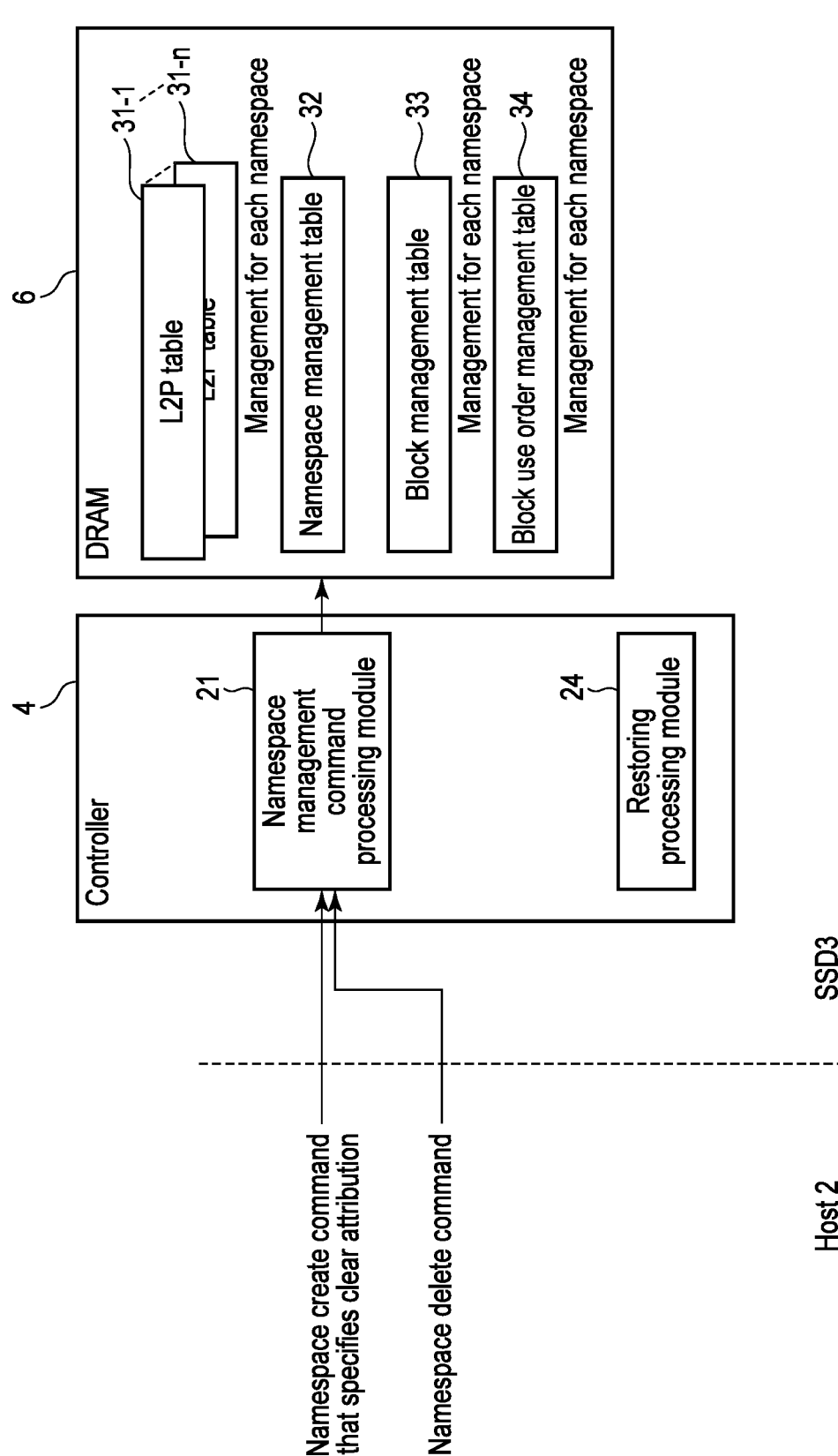
F I G. 10

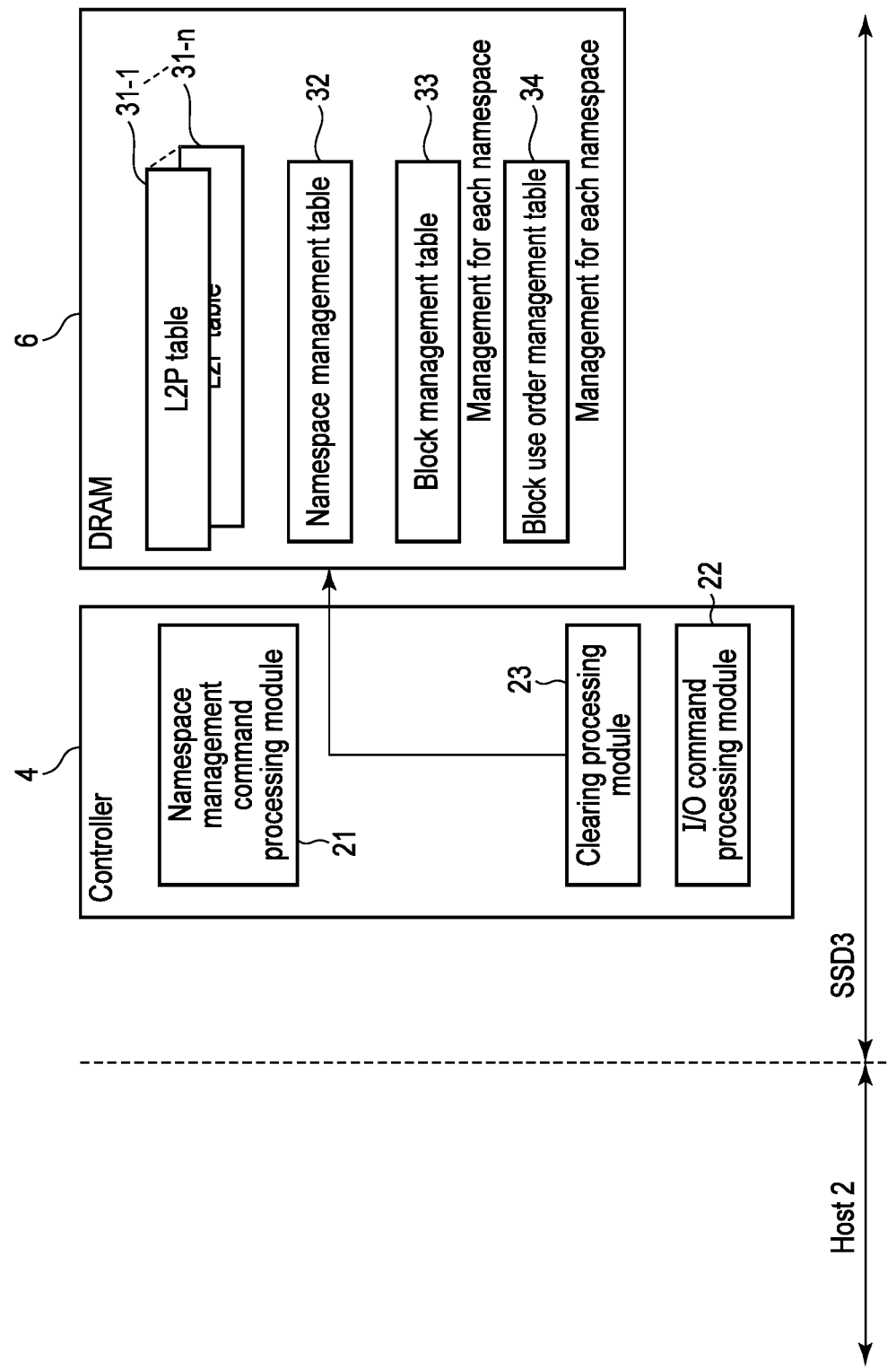
F I G. 11

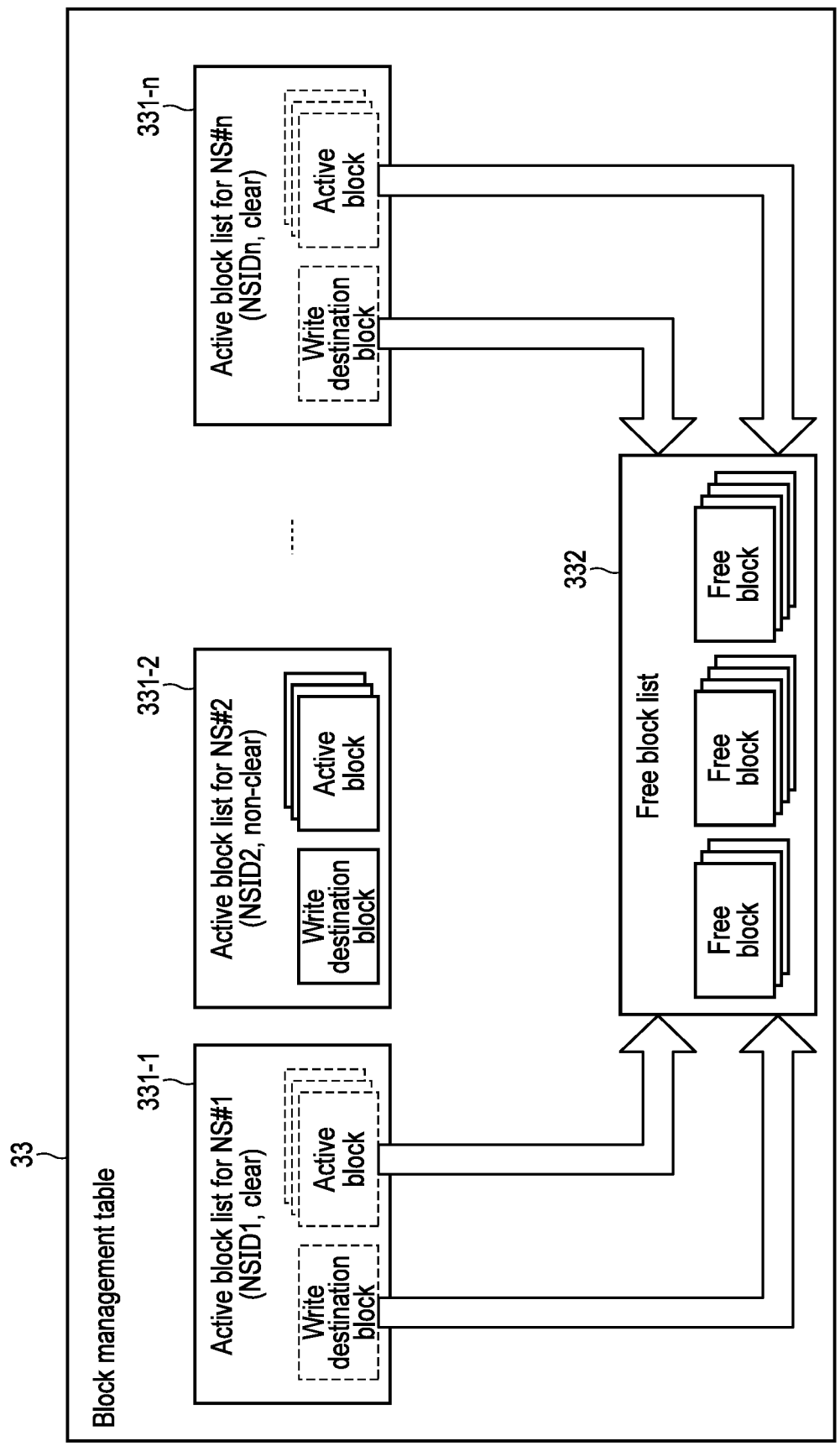
F I G. 13

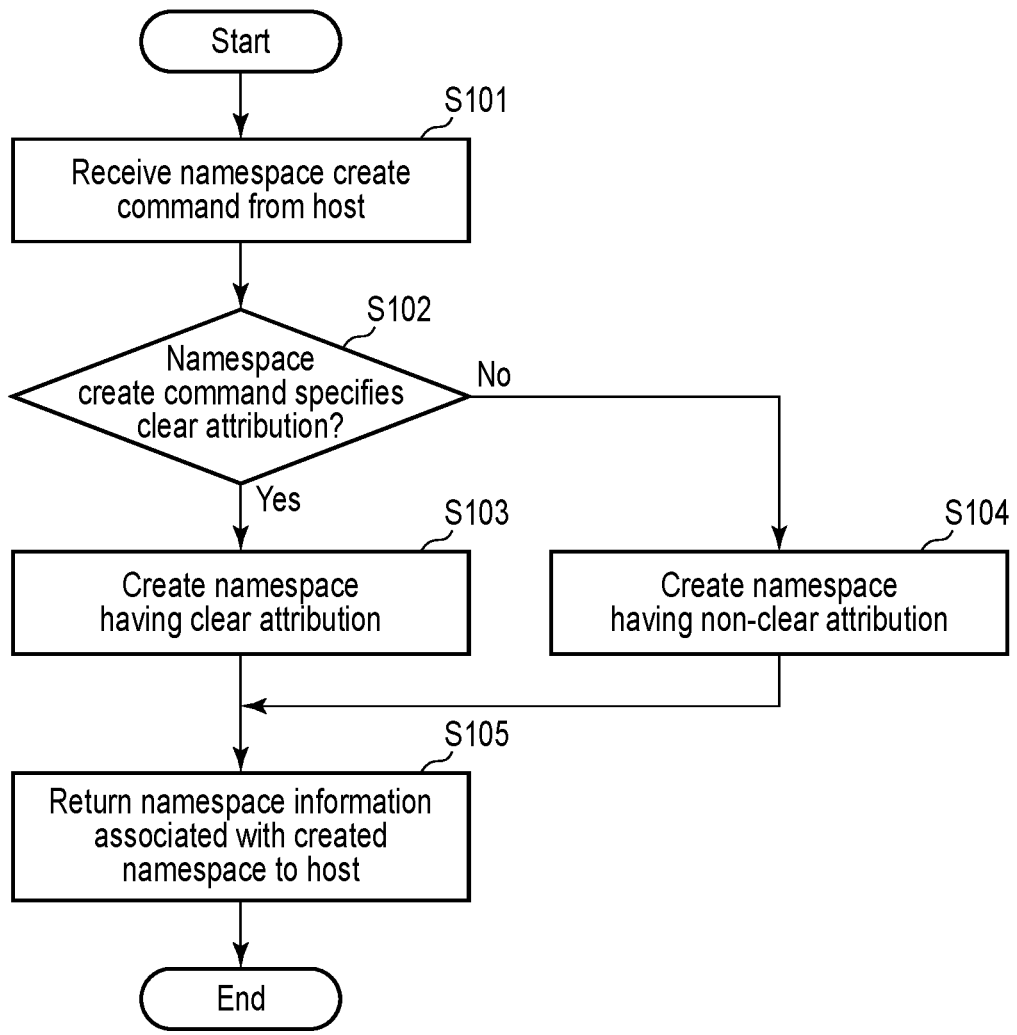
F I G. 15

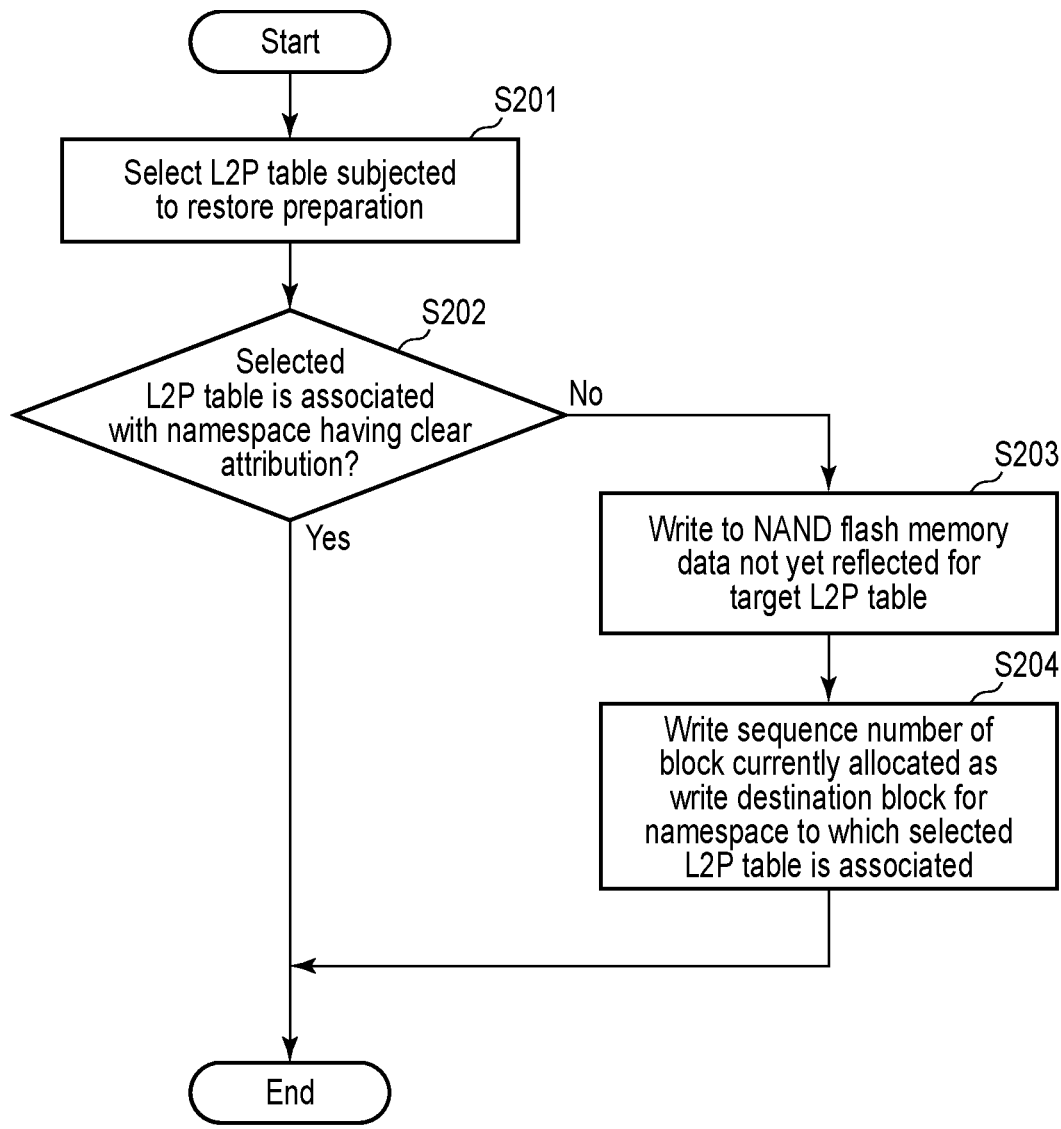
F I G. 16

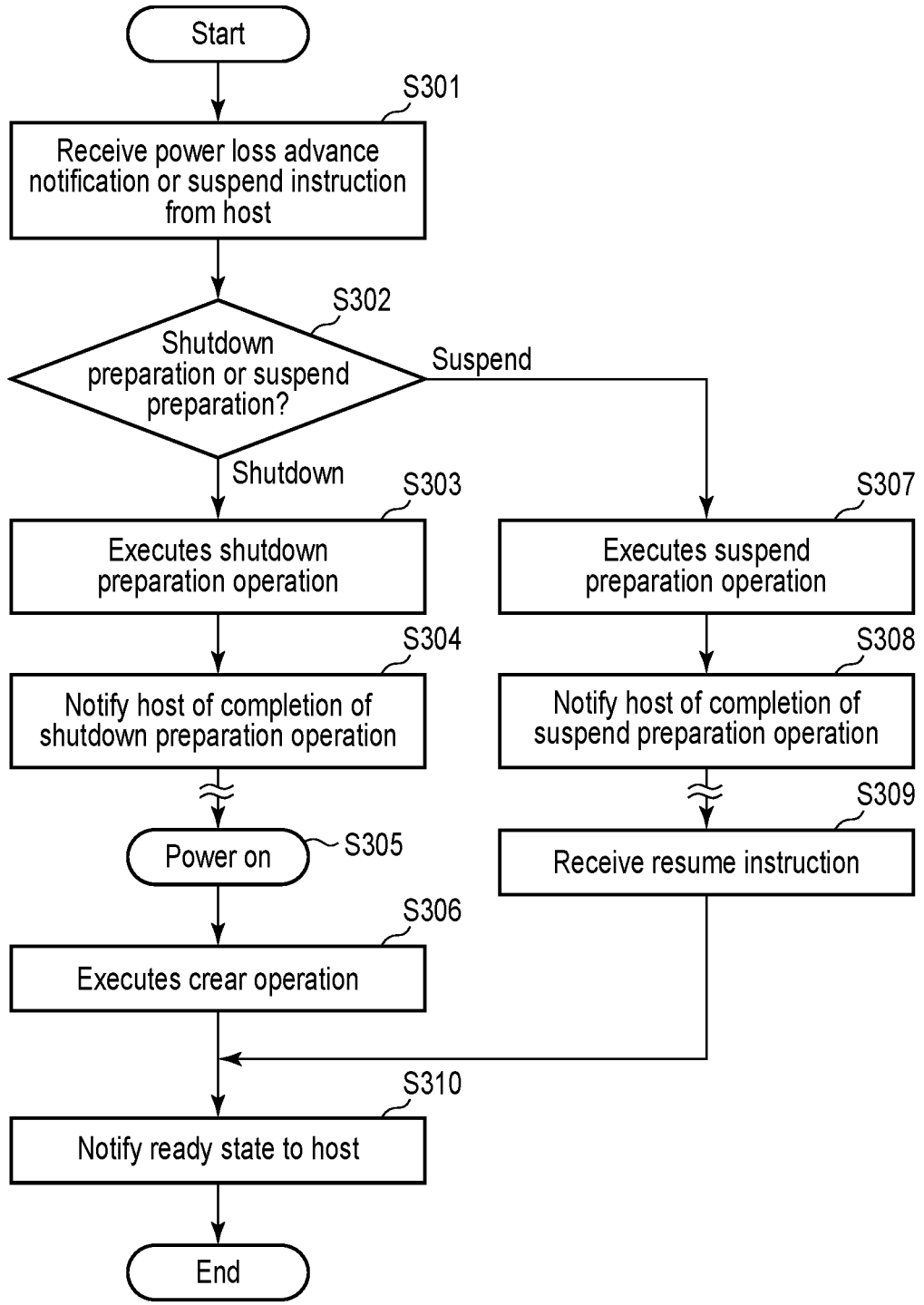
F I G. 17

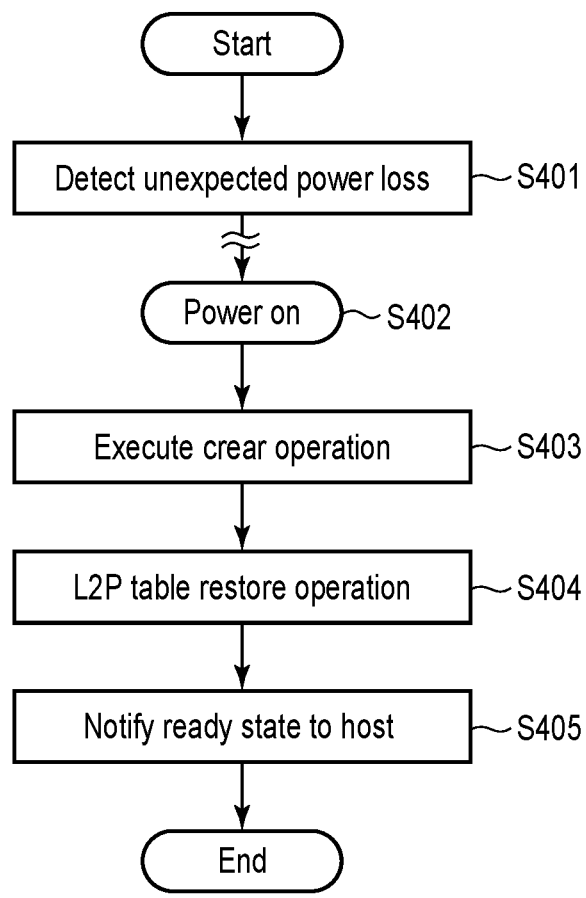
F I G. 18

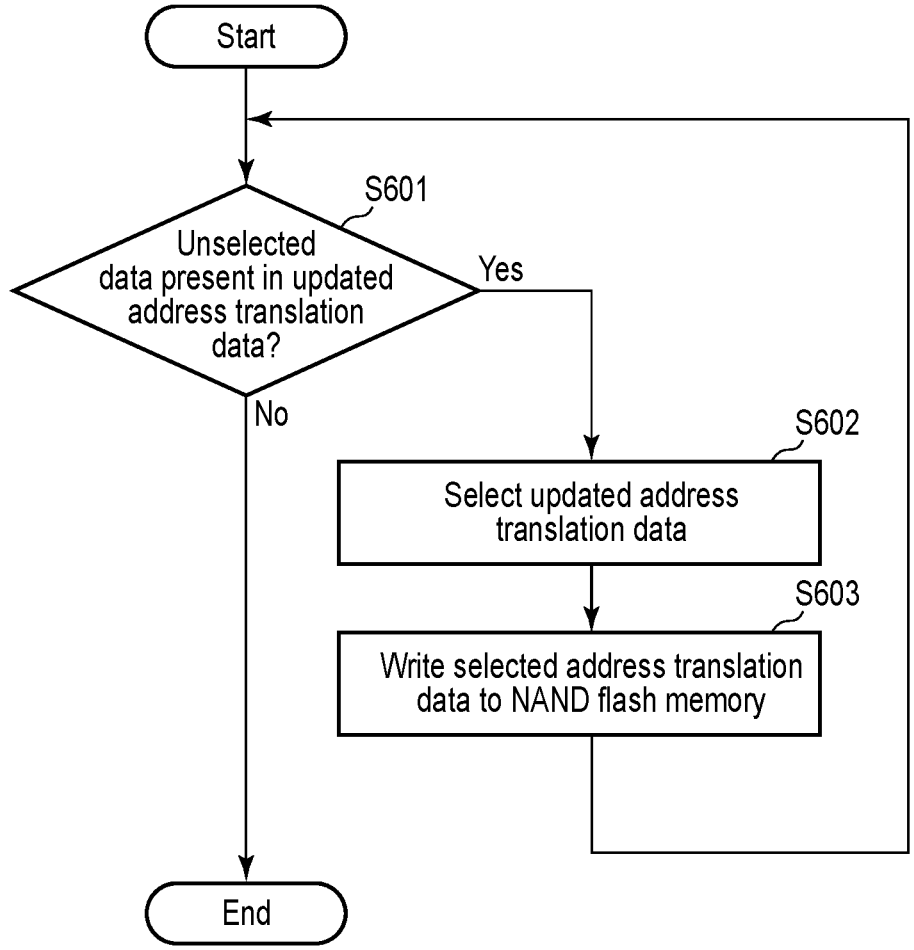
F I G. 20

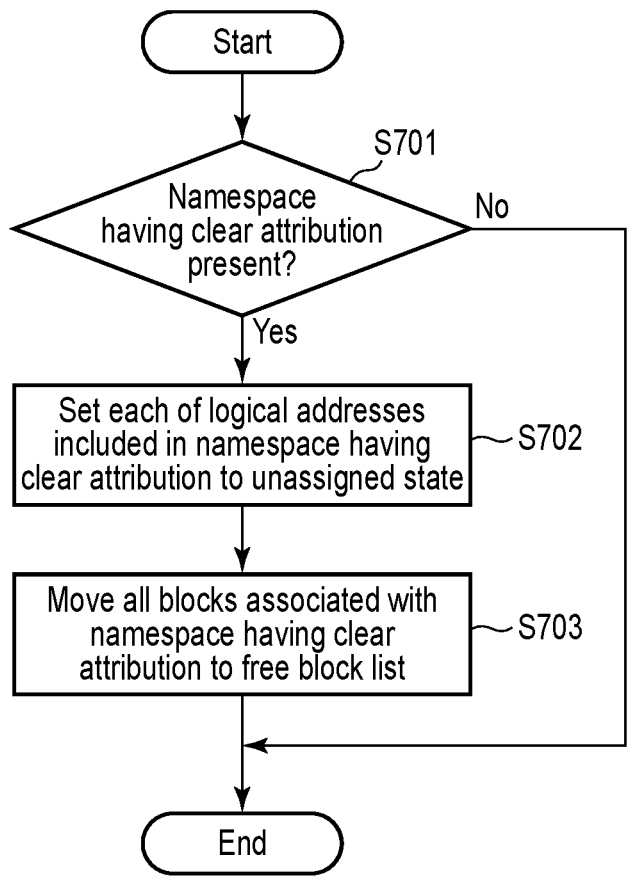
F I G. 21

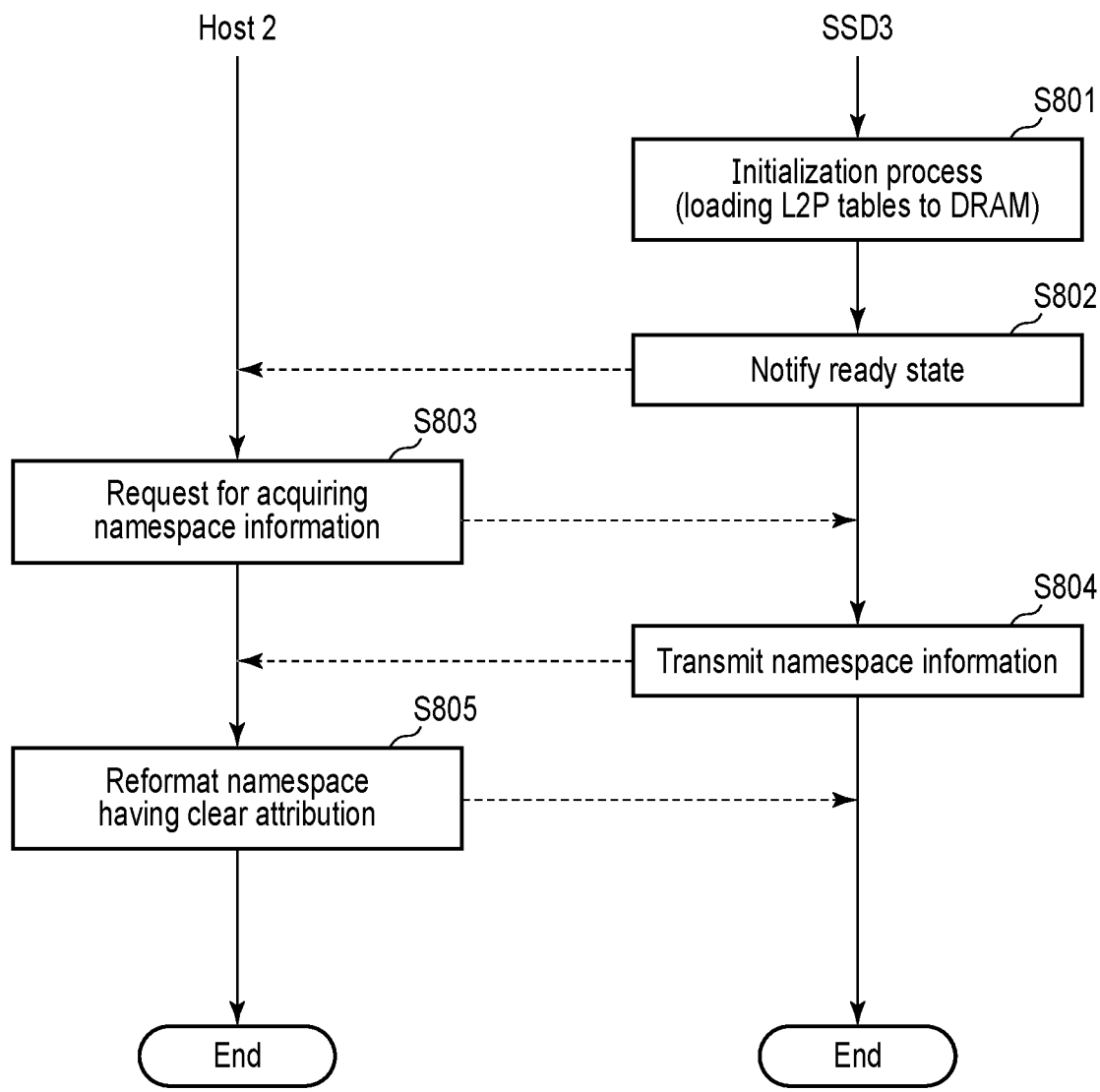
F I G. 22

MEMORY SYSTEM AND METHOD OF CONTROLLING NONVOLATILE MEMORY USING NAMESPACE ATTRIBUTES

CROSS-REFERENCE TO RELATED APPLICATIONS

This application is based upon and claims the benefit of priority from Japanese Patent Application No. 2021-011137, filed Jan. 27, 2021, the entire contents of which are incorporated herein by reference.

FIELD

Embodiments described herein relate generally to a technique of controlling a nonvolatile memory.

BACKGROUND

In recent years, memory systems that include nonvolatile memories are widely used. For example, solid state drives (SSDs) that include NAND flash memories are well known as a type of such memory systems.

Because of its high performance, the solid state drive (SSD) which can perform rapid input/output of data is effectively used for a swap area as well as an user data storage area in a storage device. The swap area is provided in a memory area of the nonvolatile memories for temporally saving swapped-out data. The swapped-out data is swapped out from a volatile memory in a host, by a swapping function of an operating system executed by the host. In the SSD, an operation to non-volatilely store the swapped-out data into the swap area of the nonvolatile memories is performed. Thus, the swapped-out data may possibly be retained in the SSD across power cycles of the SSD.

However, a requirement for the swap area is to retain the swapped-out data stored therein at least during a period in which the host is powered on. So to retain the swapped-out data stored in the SSD across the power cycles of the SSD means to retain the swapped-out data in the SSD that is no longer used by the host. As a result, an unnecessary wear of the nonvolatile memories of the SSD may occur.

Thus, a novel technique of reducing the wear of the nonvolatile memory is required.

BRIEF DESCRIPTION OF THE DRAWINGS

FIG. 2 is a diagram illustrating an example of a configuration of a NAND flash memory included in the memory system according to the embodiment.

FIG. 6 is a diagram illustrating a block management table managed in the memory system according to the embodiment.

FIG. 7 is a diagram illustrating a block use order management table managed in the memory system according to the embodiment.

FIG. 9A is a first diagram illustrating a restore preparation operation of a logical-to-physical address translation table, which is executed in the memory system according to the embodiment.

FIG. 10 is a diagram illustrating an operation of creating a namespace having a clear attribution and an operation of omitting a restore preparation operation with respect to a logical-to-physical address translation table associated with a namespace having a clear attribution.

FIG. 11 is a diagram illustrating a clear operation executed in the memory system according to the embodiment.

FIG. 13 is a diagram illustrating an operation of managing each of blocks associated with a namespace having a clear attribution as a free block, which is executed in the memory system according to the embodiment.

FIG. 15 is a flowchart illustrating a procedure of a namespace creation operation executed in the memory system according to the embodiment.

FIG. 16 is a flowchart illustrating a procedure of a restore preparation operation executed in the memory system according to the embodiment.

FIG. 17 is a flowchart illustrating a procedure of an operation executed in the memory system according to the embodiment, during a period from a time when receiving a power loss advance notification from a host until a time when a controller of the memory system becomes a ready state by resupply of a power to the memory system.

FIG. 18 is a flowchart illustrating a procedure of an operation executed in the memory system according to the embodiment, during a period from a time when detecting an unexpected power loss until a time when the controller becomes the ready state by resupply of a power to the memory system.

FIG. 20 is a flowchart illustrating a procedure of a suspend preparation operation executed in the memory system according to the embodiment.

FIG. 21 is a flowchart illustrating a procedure of a clear operation executed in the memory system according to the embodiment.

FIG. 22 is a flowchart illustrating a procedure of an operation executed by the memory system according to the embodiment and the host after a power is supplied to the memory system again.

DETAILED DESCRIPTION

Various embodiments will be described hereinafter with reference to the accompanying drawings.

In general, according to one embodiment, a memory system is connectable to a host. The memory system, for example an SSD, includes a nonvolatile memory and a controller electrically connected to the nonvolatile memory. In response to receiving a first namespace creation command specifying a first attribution from the host, the controller creates a first namespace having the first attribution and a first logical address range. The first logical address range includes logical addresses. The controller sets each of the logical addresses to an unallocated state in which a physical address of the nonvolatile memory is not mapped, during a first period from a time when receiving a power loss advance notification (i.e., a graceful shutdown advance notification, or a shutdown notification) from the host or when detecting an unexpected power loss (i.e., an abrupt shutdown, an unsafe power loss, or an unexpected shutdown) of the memory system until a time when the controller becomes a ready state by resupply of a power to the memory system. The power loss advance notification is a notification notifying that supply of a power to the memory system will be turned off. The ready state is a state in which a command from the host can be processed by the controller.

Figure 1:
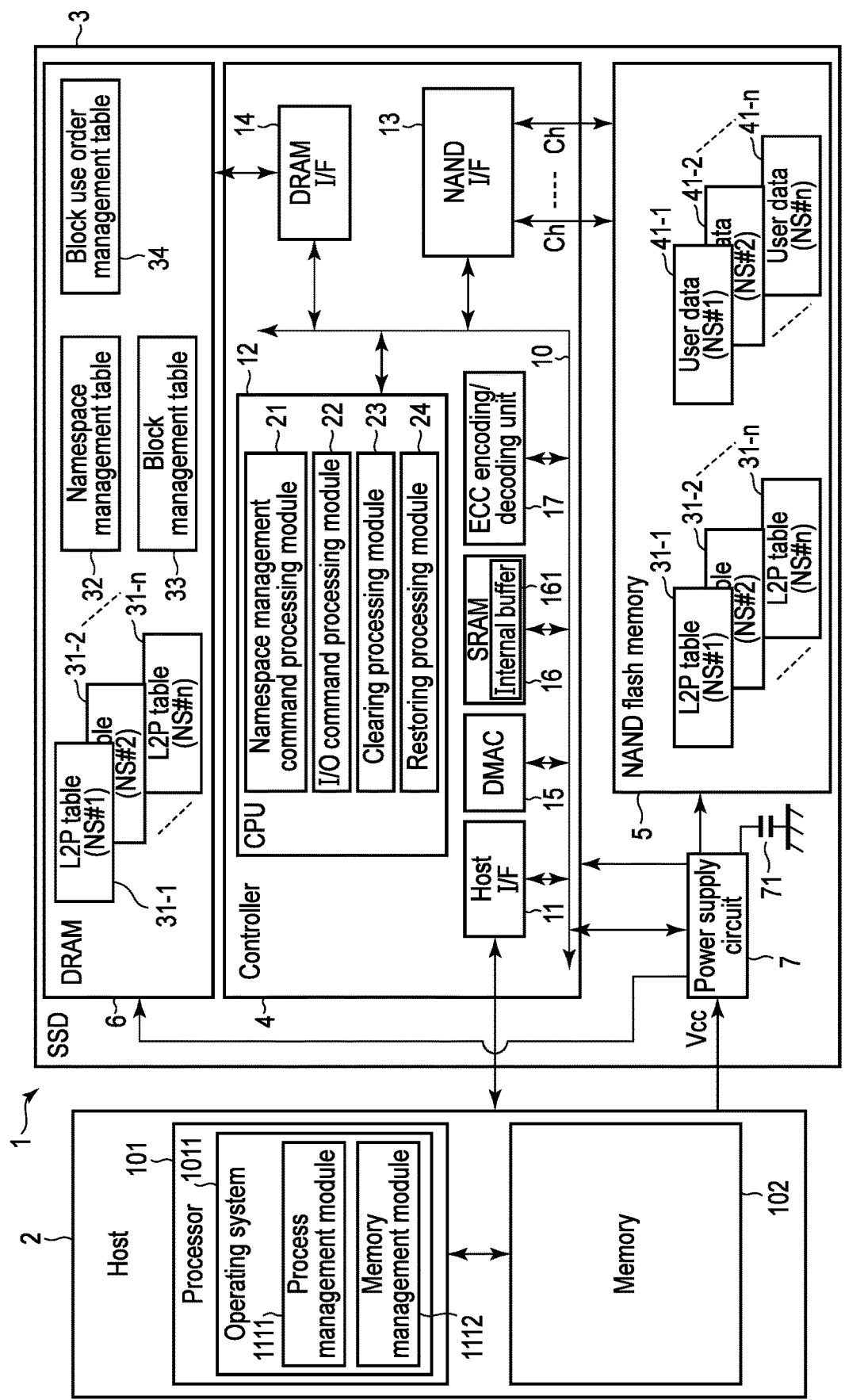
FIG. 1 is a block diagram illustrating an example of a configuration of an information processing system including a memory system according to an embodiment.

FIG. 1 is a block diagram illustrating an example of a configuration of an information processing system 1 including a memory system according to an embodiment. The information processing system 1 includes a host (host device) 2 and an SSD 3.

The memory system is a semiconductor storage device that writes data to a nonvolatile memory and reads the data from the nonvolatile memory. Hereinafter, the memory system is realized as, for example, the SSD 3.

The SSD 3 may be connected to the host 2 via a cable or network. Or, the SSD 3 may be integrated in the host 2. A logical interface for connecting between the host 2 and the SSD 3 may be, for example, NVM Express™ (NVMe™), Serial Attached SCSI (SAS), or Serial ATA (SATA).

The host 2 controlling the SSD 3 may be an information processing, such as a personal computer, a server computer, a mobile terminal, or a vehicle-mounted terminal, for example.

The host 2 includes a processor 101 and a memory 102. The processor 101 is a CPU (Central Processing Unit) that controls an operation of each component included in the host 2. The processor 101 executes software (host software) loaded into the memory 102 from the SSD 3 or another storage device that is connected to the host 2. The host software includes an operating system (OS) 1011. In addition to the operating system 1011, the host software includes a file system, a device driver, and application programs.

The memory 102 is a main memory provided with the host 2. The memory 102 is realized by a random access memory such as DRAM (Dynamic Random Access Memory), which is a volatile memory to lose its stored data when supply of a power is turned off.

The operating system 1011 manages resources of the entire information processing system 1 that includes the processor 101, the memory 102, and the SSD 3. The operating system 1011 also manages the application programs (hereinafter referred to as programs) which run on the host 2.

In the example of FIG. 1, the operating system 1011 includes a process management module 1111 and a memory management module 1112. The process management module 1111 manages: creation of each of processes executed in the host 2; execution of each of the processes; and termination of each of the processes. The memory management module 1112 allocates a portion of a memory area of the memory 102 to a specific process, based on a memory allocation request from the process management section 1111.

When starting execution of a certain program, the process management module 1111 of the operating system 1011 creates a process for the program. Then, the process management module 1111 requests the memory management module 1112 to allocate a memory area to the created process. Upon receiving the request of the memory allocation, the memory management module 1112 allocates a portion of the memory area of the memory 102 to the process. The process management module 1111 reads the program from the SSD 3 or other storage device included in the information processing system 1 and loads this program into this allocated memory area.

Here, a case where the contents of the memory area allocated to a certain process are written or read to or from the SSD 3 at a timing of "swap-out" or "swap-in" will be explained.

Upon receiving a memory allocation request for a certain process from the process management module 1111, the memory management module 1112 may save data stored in a memory area of the memory 102, which is allocated to another process, to the SSD 3 in order to prepare a memory area to be allocated the certain process. This saving operation is called "swap-out". The data that is swapped out from the memory 102 to the SSD 3 is written to the nonvolatile memory included in the SSD 3. When a certain process that has been executed on the processor 101 and swapped out to the SSD 3 is to be executed on the processor 101 again, the swapped-out data is read from the SSD 3 and returned to a memory area of the memory 102. This returning operation is called "swap-in".

Here, swapping out and swapping in between the memory 102 and the SSD 3 are only performed 2 while the host 2 is powered on. After the host 2 is powered off by shutting down the operating system 1011, that is, after the supply of power from the host 2 to the SSD 3 is turned off, the swapped-out data that has been written to the SSD 3 by the swap out becomes unnecessary data that is no longer used by the host 2.

Similarly, for example, files written to a folder referred to as "Tmp" folder (or "/Tmp" directory) are also unnecessary data that is no longer used by host 2 after the host 2 is powered off by shutting down the operating system 1011, that is, after the supply of power from the host 2 to the SSD 3 is turned off.

Next, a configuration of the SSD 3 will be explained. The SSD 3 includes a controller 4, a nonvolatile memory (e.g., NAND flash memory 5), a random access memory (e.g., DRAM 6), and a power supply circuit 7.

The controller 4 controls a data write operation for writing data to the NAND flash memory 5 based on a command received from host 2 and a data read operation of reading data (read target data) from the NAND flash memory 5 based on a command received from host 2.

The controller 4 may be realized by a circuit such as a System-on-a-Chip (SoC). Each function of controller 4 may be realized by a specific hardware circuit, a processor that executes a program (firmware), or combination thereof.

The controller 4 is electrically connected to the NAND flash memory 5 via a NAND interface 13 that conforms to standards such as Toggle NAND flash interface or Open NAND Flash Interface (ONFI). However, the standards to which the NAND interface 13 conforms is not limited to these examples. The controller 4 operates as a memory controller that controls the NAND flash memory 5.

The controller 4 may function as a flash translation layer (FTL) for performing management of data in the NAND flash memory 5 and management of blocks in the NAND flash memory 5.

The management of data performed by the FTL includes (1) management of address translation data (mapping information) that indicates the correspondence between each of logical addresses and each of physical addresses of the NAND flash memory 5, (2) processing to hide restrictions of the NAND flash memory 5 (e.g., page-by-page read/write operations and block-by-block data erase operations), etc. A physical address corresponding to a certain logical address indicates a physical memory location in the NAND flash memory 5 to which data corresponding to the logical address is written. The controller 4 manages mapping between each of logical addresses and each of physical addresses by using a logical-to-physical address translation table (L2P table). In general, a logical block address (LBA) can be used as the logical address.

In the present embodiment, the controller 4 is configured to manage mapping between each of the logical addresses corresponding to each namespace and each of the physical addresses of the NAND flash memory 5 for each of namespaces, by using multiple L2P tables (e.g., L2P tables 31-1 to 31-n) corresponding to the multiple namespaces.

A part or all of the address translation data of each of the L2P tables 31-1 to 31-n are loaded from the NAND flash memory 5 into the DRAM 5 during an initialization process of the SSD 3. The initialization process is executed by the controller 4 in response to supply of a power to the SSD 3.

Each of the L2P tables 31-1 to 31-n may be realized as a hierarchical L2P table that includes a plurality of tables corresponding to a plurality of hierarchical levels. However, the configuration of each of the L2P tables 31-1 to 31-n is not limited to the hierarchical L2P table. An example of the hierarchical L2P table will be described below with reference to FIG. 3.

The NAND flash memory 5 includes a memory cell array including a plurality of memory cells arranged in a matrix. The NAND flash memory 5 may be a flash memory having a two-dimensional structure or a flash memory having a three-dimensional structure.

As shown in FIG. 2, the memory cell array of NAND flash memory 5 includes a plurality of blocks BLK0 to BLKx−1. Each of the blocks BLK0 to BLKx−1 includes a plurality of pages (in this example, pages P0 to Py−1). Each page includes a plurality of memory cells connected to the same word lines. Each of the blocks BLK0 to BLKx−1 is a unit for data erase operation of erasing data. Each of the pages P0 to Py−1 is a unit for a data write operation of writing data and a data read operation of reading data.

Referring again to FIG. 1, the NAND flash memory 5 is used to store a plurality of L2P tables 31-1 to 31-n respectively corresponding to a plurality of namespaces NS #1 to NS #n and a plurality of user data 41-1, . . . , 41-n corresponding to the plurality of namespaces NS #1 to NS #n. Where "n" is a natural number greater than or equal to 2.

The DRAM 6 is a volatile memory. A part of a memory area of the DRAM 6 is used to store the L2P tables 31-1 to 31-n, a namespace management table 32, a block management table 33, and a block usage order management table 34. Details of the namespace management table 32, the block management table 33, and the block usage order management table 34 will be described later with reference to FIGS. 5, 6, and 7.

The power supply circuit 7 uses an external power supplied from the host 2 (i.e., a power supply voltage Vcc), to generate internal power supply voltages to drive the controller 4, the NAND flash memory 5, and the DRAM 6, and supplies the generated internal power supply voltages to the controller 4, the NAND flash memory 5, and the DRAM 6, respectively.

Furthermore, the power supply circuit 7 communicates with the controller 4. When the voltage value of the external power supply voltage Vcc drops below a predetermined value, the power supply circuit 7 notifies the controller 4 that the supply of the external power to the SSD 3 has been turned off (hereinafter referred to as power off detection notification). For example, when the controller 4 receives the power off detection notification from the power supply circuit 7 before receiving a notification from the host 2 notifying that the supply of the external power to the SSD 3 will be turned off (hereinafter referred to as power loss advance notification), the controller 4 will detect that an unexpected power loss occurs. The unexpected power loss occurs when the supply of the external power to the SSD 3 is suddenly turned off without the notification from the host 2 that the supply of the external power to the SSD 3 will be soon turned off.

The power supply circuit 7 may also have a power loss protection (PLP) function that enables continuous supplying the internal power supply voltages to the controller 4, the NAND flash memory 5, and the DRAM 6 for a predetermined period of time after the unexpected power loss occurs. In this case, the power supply circuit 7 may be connected to, for example, a capacitor 71. When the supply of the external power supply voltage Vcc from the host 2 to the power supply circuit 7 is turned off due to the unexpected power loss, the power supply circuit 7 uses the energy stored in the capacitor 71 to supply the internal power supply voltages to the controller 4, the NAND flash memory 5, and the DRAM 6 for a predetermined period of time after the unexpected power loss occurs.

Next, a detailed configuration of the controller 4 will be described. The controller 4 includes a host interface (host I/F) 11, a CPU 12, a NAND interface (NAND I/F) 13, a DRAM interface (DRAM I/F) 14, a direct memory access controller (DMAC) 15, a static random access memory (SRAM) 16, and an error correction code (ECC) encoding/decoding unit 17. The host interface 11, the CPU 12, the NAND interface 13, the DRAM interface 14, the DMAC 15, the SRAM 16, and the ECC encoding/decoding unit 17 are interconnected via a bus 10.

The host interface 11 is a host interface circuit that performs communication with the host 2. The host interface circuit 11 receives various requests or notifications from the host 2. Examples of various requests or notifications include power loss advance notifications, namespace create requests (namespace create command), namespace delete requests (namespace delete command), write requests (write command), and read requests (read command).

The power loss advance notification is an advance notice notifying that the supply of the external power to the SSD 3 will be turned off, as described above. Before the host 2 is powered off, the host 2 transmits the power loss advance notification to the SSD 3 to notify the SSD 3 that the supply of the external power to the SSD 3 will soon be turned off.

As the power loss advance notification, for example, Shutdown Notification that is defined in the NVMe standard and STANDBY IMMEDIATE command that is defined in the SATA standard may be used.

When receiving the power loss advance notification from the host 2, the controller 4 performs a shutdown preparation operation. The shutdown preparation operation includes an operation of writing the contents of DRAM 6 (e.g., the contents of the updated L2P table) that have not yet been written to the NAND flash memory 5 to the NAND flash memory 5. The host 2 does not turned off the supply of the external power to the SSD 3 until the controller 4 notifies the host 2 that the shutdown preparation operation of the SSD 3 has been completed, or until a predetermined period of time has elapsed after transmitting the power loss advance notification to the SSD 3.

The namespace create command is a command that requests the SSD 3 to create a namespace. The namespace delete command is a command that requests the SSD 3 to delete a specific namespace.

The write command is a command that requests the SSD 3 to write data (write data) to a specific namespace. The write command specifies, for example, a namespace identifier of a namespace to which the write data is to be written, a start LBA corresponding to the write data, a size of the write data (number of LBAs), and a data pointer (buffer address) indicating a location in the memory 102 of the host 2 where the write data is stored.

The read command is a command that requests the SSD 3 to read data (read target data). The read command specifies, for example, a namespace identifier of a namespace from which the read target data is to be read, a start LBA corresponding to the read target data, the size of the read target data (number of LBAs), and a data pointer (buffer address) indicating a location in the memory 102 of the host 2 to which the read target data is to be transferred.

The NAND interface 13 is a NAND controller that controls the NAND flash memory 5 under the control of the CPU 12. When the NAND flash memory 5 includes a plurality of NAND flash memory chips (NAND flash memory die), the NAND interface 13 may be connected to the plurality of NAND flash memory chips through a plurality of channels (Ch).

The DRAM interface 14 is a DRAM controller that controls the DRAM 6 under the control of the CPU 12.

The DMAC 15 performs data transfer between the memory 102 of the host 2 and the SRAM 16 (or DRAM 6) under the control of the CPU 12.

The SRAM 16 is a volatile memory. The SRAM 16 includes an internal buffer 161. The internal buffer 161 may be used as a write buffer to temporarily store write data to be written to the NAND flash memory 5.

When data is to be written to the NAND flash memory 5, the ECC encoding/decoding unit 17 encodes the data to be written, thereby adding an error correction code (ECC) to the data as a redundant code. When data is read from the NAND flash memory 5, the ECC encoding/decoding unit 17 performs error correction of the read data by using the ECC added to the read data.

The CPU 12 is a processor that controls the host interface 11, the NAND interface 13, the DRAM interface 14, the DMAC 15, the SRAM 16, and the ECC encode/decode unit 17. The CPU 12 loads a control program (firmware) stored in the NAND flash memory 5 or a ROM (not shown) into the SRAM 16 (or the DRAM 6) and performs various operations by executing the firmware.

The CPU 12 can function as a namespace management command processing module 21, an I/O command processing module 22, a clearing processing module 23, and a restoring processing module 24. A part or all parts of each of the namespace management command processing module 21, the I/O command processing module 22, the clearing processing module 23, and the restoring processing module 24 may be realized by dedicated hardware in the controller 4.

The namespace management command processing module 21 creates a namespace based on a namespace create command received from the host 2 and manages the created namespace. The namespace management command processing module 21 can create a plurality of namespaces and manage those created namespaces. The namespaces are corresponding to logical address ranges which are independent of each other. The plurality of namespaces provided in one storage device (SSD) are used to operate as if the one storage device functions as being a plurality of storage devices. The namespaces are used by the host 2 to access to the SSD 3.

Furthermore, based on a namespace delete command received from the host 2, the namespace management command processing module 21 deletes a namespace specified by the namespace delete command.

In the present embodiment, the namespace management command processing module 21 is configured to create a namespace having a clear attribution or a namespace having a non-clear attribution and manage such the namespace. The namespace having the clear attribution is a namespace that is allowed to invalidate data associated with the logical address range of the namespace after the supply of the external power to the SSD 3 is turned off. In other words, the namespace having the clear attribution is a namespace that is not required to retain data written to the namespace across power cycles of the SSD 3. The data written to the namespace is data that is associated with the logical address range of the namespace. Therefore, the clear attribution indicates unnecessity of retaining data associated with the logical address range of the namespace across power cycles of the SSD 3. On the other hand, the namespace having the non-clear attribution is a namespace that is not allowed to invalidate data associated with the logical address range of the namespace after the supply of the power to the SSD 3 is turned off. In other words, the namespace having the non-clear attribution is a namespace that is required to retain data written to the namespace across power cycles of the SSD 3. Therefore, the non-clear attribution indicates necessity of retaining data associated with the logical address range the namespace across power cycles of the SSD 3.

A process of turning off the supply of the external power from the host 2 to the SSD 3, and then supplying the external power from the host 2 to the SSD 3 again corresponds to one power cycle for the SSD 3.

Once the supply of the external power to the SSD 3 is turned off, even if the external is supplied to the SSD 3 again, the data written by the host 2 to the namespace having the clear attribution before the supply of the external power to the SSD 3 is turned off can no longer be referenced by the host 2. Data written to the namespaces having the clear attribution will be retained only during a period the external power is supplied to the SSD 3, that is, only while the power state of host 2 is in a working state (power-on state) in which host software can be executed.

The namespace management command processing module 21 supports a new namespace create command that can specify a clear attribution or a non-clear attribution. This new namespace create command includes a parameter that specifies whether an attribution of a namespace to be created is a clear attribution or a non-clear attribution. This parameter is set by the host 2 to either a value indicating the clear attribution or a value indicating the non-clear attribution.

When a namespace create command that specifies the clear attribution, that is, a namespace create command that includes a parameter set to a value indicating the clear attribution, is received from the host 2, the namespace management command processing module 21 creates a namespace having the clear attribution and transmits a namespace identifier of the created namespace to the host 2. Then, the namespace management command processing module 21 manages the namespace identifier of the created namespace in association with attribution information indicating the clear attribution by using the namespace management table 32.

The host 2 can use the namespace having the clear attribution as a write destination namespace for data that does not need to be retained across power cycles of the SSD 3, for example, as a swap area.

When a namespace create command that specifies the non-clear attribution, that is, a namespace create command that includes a parameter set to a value indicating the non-clear attribution, is received from host 2, the namespace management command processing module 21 creates a namespace having the non-clear attribution. The namespace having the non-clear attribution is a namespace in which data associated with the logical address range of this namespace must be retained across power cycles of the SSD 3. The namespace management command processing module 21 manages a namespace identifier of the created namespace in association with attribution information indicating the non-clear attribution by using the namespace management table 32.

The host 2 can use the namespace having the non-clear attribution as a write destination namespace for writing data that needs to be retained across power cycles of the SSD 3.

The I/O command processing module 22 executes processing of various I/O commands received from the host 2. The I/O commands include a write command, a read command, etc.

When the controller 4 receives a write command from the host 2 that specifies a certain namespace identifier, the I/O command processing module 22 executes an operation of writing data associated with the received write command to the NAND flash memory 5. In that case, the I/O command processing module 22 allocates a write destination block for a specific namespace which is identified by the namespace identifier specified by the received write command. Then, the I/O command processing module 22 writes the data associated with the received write command to this write destination block. If the write destination block for this specific namespace has already been allocated, there is no need to perform the operation of newly allocating a write destination block. Then, the I/O command processing module 22 updates an L2P table associated with this specific namespace such that a physical address indicating a physical storage location in the NAND flash memory 5 where this data is written is mapped to a logical address corresponding to this data. The L2P table associated with this specific namespace is used to manage the mapping between each of the logical addresses included in the logical address range of this specific namespace and each of the physical addresses in the NAND flash memory 5.

When the controller 4 receives a read command from the host 2 specifying a certain namespace identifier, the I/O command processing module 22 refers to the L2P table associated with the namespace specified by the namespace identifier to obtain a physical address mapped to a logical address (LBA) of read target data specified by the received read command. The I/O command processing module 22 reads data stored in a physical storage location in the NAND flash memory 5 indicated by the acquired physical address from the NAND flash memory 5. Then, the I/O command processing module 22 returns the read data to the host 2 as the read target data.

The clearing processing module 23 executes a clear operation for the namespace with the clear attribution. The clear operation is performed during a period from when the controller 4 receives a power loss advance notification from the host 2 or detects an unexpected power loss until the controller 4 becomes the ready state by resupply of a power to the SSD 3.

The clear operation is an operation that sets each of the logical addresses included in the logical address range of the namespace having the clear attribution to an unallocated state in which a physical address of the NAND flash memory 5 is not mapped.

By this clear operation, all the data associated with the logical address range of the namespace having the clear attribution become invalid data. Therefore, by the clear operation, the namespace having the clear attribution will be in the same state as a namespace immediately after its creation where no data has been written yet. Therefore, all blocks associated with the namespace having the clear attribution become free blocks that do not contain any valid data which may be read from the host 2 later.

Therefore, by using a namespace having a clear attribution as a write destination for data that does not need to be retained across power cycles of the SSD 3, for example, a swap area, the physical storage area in the NAND flash memory 5 can be prevented from being unnecessary consumed by data that does not need to be retained across power cycles of the SSD 3.

For example, the clearing processing module 23 may execute the clear operation during a period from when the external power is supplied to the SSD 3 again until the controller 4 becomes the ready state.

Alternatively, the clearing processing module 23 may execute the clear operation in response to the controller 4 receiving the power loss advance notification from the host 2 or in response to the controller 4 detecting the unexpected power loss. In the case where the clearing processing module 23 executes the clear operation in response to the controller 4 receiving the power loss advance notification from the host 2 or in response to the controller 4 detecting the unexpected power loss, the clearing processing module 23 preferably writes information indicating that the clear operation has been completed to the NAND flash memory 5 as status information of the clear operation when the clear operation is completed. This allows the clearing processing module 23 to determine whether or not the clear operation for the namespace having the clear attribution has been successfully completed, after the external power is supplied to the SSD 3 again.

In the case where the clear operation is executed during the period from when the external power is supplied to the SSD 3 again until the controller 4 becomes the ready state, the clearing processing module 23 does not need to execute the clearing operation when the controller 4 receives a power loss advance notification from host 2 or when the controller 4 detects an unexpected power loss. Therefore, for example, the time required from when the SSD 3 receives the power loss advance notification until the SSD 3 transitions to a state in which the SSD 3 can be safely shut down can be reduced.

Furthermore, there is no need to perform the operation of writing status information to the NAND flash memory 5 indicating whether or not the clear operation has been completed. Therefore, the amount of processing that needs to be performed by the controller 4 can be reduced compared to the case where the clear operation is performed in response to receiving the power loss advance notification or detecting the unexpected power loss.

In order to set each of logical addresses included in the namespace having the clear attribution (e.g., namespace NS #1) to the unallocated state, the clearing processing module 23 may set the L2P table 31-1 corresponding to the namespace NS #1 having the clear attribution to an initial state. The initial state of the L2P table 31-1 is a state where a specific value (e.g., initial value) indicative of the unallocated state is stored in the L2P table 31-1 as address translation data.

Alternatively, the clearing processing module 23 may, instead of setting the L2P table 31-1 corresponding to the namespace NS #1 having the clear attribution to the initial state, discard the L2P table 31-1 corresponding to the namespace NS #1 having the clear attribution, thereby setting each of the logical addresses included in the namespace NS #1 to the unallocated state. In that case, the clearing processing module 23 may newly prepare an L2P table which is in the initial state and assign the prepared L2P table to the namespace NS #1 as a new L2P table 31-1 for the namespace NS #1.

In a state in which the L2P table 31-1 is implemented as a hierarchical L2P table that includes multiple tables corresponding to multiple hierarchical levels, the clearing processing module 23 sets only the table of the highest hierarchical level among the multiple hierarchical levels in the hierarchical L2P table to the initial state. Or, the clearing processing module 23 may discard only the table of the highest hierarchical level. By setting the table of the highest hierarchical level among the multiple hierarchical levels in the hierarchical L2P table to the initial state or discarding the table of the highest hierarchical level, the clearing processing module 23 can easily set each of the logical addresses included in the namespace NS #1 to the unallocated state.

As standard specification for power management of a system such as a computer, Advanced Configuration and Power Interface (ACPI) is known. In the ACPI specification, system power states are defined as system states (S0-S5) and device power states are defined as device power states (D0-D3). In the following description, although no limitation is intended, the power states defined in the ACPI specification are used as power states that can be taken by the host 2 and the SSD 3.

When the power state of the host 2, i.e., the system power state, transitions from the working state (S0 state) to the suspend state (S3 state, or S4 state), the host 2 transmits to the SSD 3 an instruction (hereinafter referred to as a suspend instruction). The suspend instruction is an instruction to change the current power state of the SSD 3 (i.e., the current device power state of the SSD 3) from the on state (D0 state) to the low power state (e.g., D1 state, D2 state, or D3 state) corresponding to the suspend state (S3 state or S4 state) of the host 2.

Here, the working state (S0 state) is the state in which the processor 101 executes instructions and reading and writing to and from the memory 102 can be performed by the processor 101. A sleep state (S3 state) or a hibernation state (S4 state) is used as the suspend state. In the sleep state (S3 state), almost all components of the host 2, except the memory 102, are powered off. On the other hand, in the hibernation state (S4 state), the contents of the memory 102 are saved as hibernation files in the namespace having the non-clear attribution of the SSD 3, and almost all components in the host 2, including the memory 102, are powered off.

In response to receiving this suspend instruction from the host 2, the controller 4 transitions the current power state of the SSD 3 from the on state (D0 state) to the low power state (D1 state, D2 state, or D3 state).

The on state (D0 state) is a state in which a power is being supplied to the SSD 3 and the SSD 3 is capable of executing command processing. The low power state (D1 state, D2 state, or D3 state) is a power state that consumes less power than the on state (D0 state). In the low power state, basically, command processing is not performed. In the D3 state, the supply of the external power to the SSD 3 is turned off. In the D1 and D2 states, to reduce the power consumption of the SSD 3, the supply of the internal power to at least a part of components of the SSD 3 is turned off while the supply of the external power to the SSD 3 is maintained, for example, the supply of the internal power to the DRAM 6 is turned off while the supply of the external power to the SSD 3 is maintained.

For example, when the power state of the host 2 transitions from the working state (S0 state) to the sleep state (S3 state), the host 2 may transmit a suspend instruction to the SSD 3 to change the current power state of the SSD 3 from, for example, the D0 state to the D1 state or D2 state. In this case, the current power state of the SSD 3 will transition from the D0 state to the D1 or D2 state.

For example, when the power state of the host 2 transitions from the working state (S0 state) to the hibernation state (S4 state), the host 2 may transmit a suspend instruction to the SSD 3 to change the current power state of the SSD 3 from, for example, the D0 state to the D3 state. In this case, the current power state of the SSD 3 transitions from the D0 state to the D3 state.

When the power state of the host 2 returns from the suspended state to the working state and the operating system 101 resumes processing, the host 2 transmits an instruction to the SSD 3 to restore the current power state of the SSD 3 from the low power state (e.g., D1 state, D2 state, or D3 state) to the on state (D0 state) (hereinafter referred to as resume instruction).

While the SSD 3 is in the D3 state, the supply of the external (i.e., the power supply voltage Vcc) to the SSD 3 is stopped. Therefore, when the current power state of the SSD 3 is restored from the D3 state to the D0 state, the host 2 also starts supplying of the power supply voltage Vcc to the SSD 3, thereby supplying the external power (power supply voltage Vcc) to the SSD 3 again.

In response to receiving this resume instruction from the host 2, the controller 4 transitions the current power state of the SSD 3 from the low power state (D1 state, D2 state, or D3 state) to the on state (D0 state).

When the power state of the host 2 returns from the suspended state to the working state, the operating system 1011 may return the data that is swapped out to the SSD 3 before the transition to the suspended state to the memory 102.

Therefore, when the suspend instruction is received from the host 2 or the resume instruction is received from the host 2, the clearing processing module 23 does not perform the clear operation. This allows the SSD 3 to continue to retain the data written to the namespace having the clear attribution. Therefore, the host 2 can successfully read, from the SSD 3, the data swapped out to the SSD 3 before transitioning to the suspend state.

The restoring processing module 24 executes an operation of loading the L2P table from the NAND flash memory 5 to the DRAM 6, a shutdown preparation operation, a restore operation of restoring the L2P table, and a restore preparation operation, which is a preparation operation for this restore operation.

After the external power is supplied from the host 2 to the SSD 3, the restoring processing module 24 loads the address translation data included in each of the L2P tables 31-1 to 31-$n$ stored in the NAND flash memory 5 into the DRAM 6. In this case, the restoring processing module 24 does not necessarily need to load the entire address translation data included in each L2P table into the DRAM 6, but may load only a part of the address translation data included in each L2P table into the DRAM 6. When writing of data to a certain namespace is executed, the I/O command processing module 22 updates the address translation data corresponding to this namespace stored in the DRAM 6 such that a physical address to which this data is written is mapped to a logical address corresponding to this data. In this manner, the address translation data of each of the L2P tables 31-1 to 31-$n$ is updated on the DRAM 6.

For the L2P table corresponding to each of the namespaces having the non-clear attribution, the restoring processing module 24 performs the shutdown preparation operation in response to the controller 4 receiving the power loss advance notification from the host 2. In this shutdown preparation operation, the restoring processing module 24 writes, to the NAND flash memory 5, the updated address translation data in the DRAM 6 that has not yet been reflected in the L2P table stored in the NAND flash memory 5. This allows the updated address translation data in the DRAM 6 that is not yet reflected in the L2P table stored in the NAND flash memory 5 to be reflected in the L2P table stored in the NAND flash memory 5 before the supply of the external power to the SSD 3 is turned off. Note that, when the power supply circuit 7 has the PLP function, even when the controller 4 detects that unexpected power loss has occurred, the restoring processing module 24 can perform the shutdown preparation operation for the L2P table corresponding to each of the namespaces having the non-clear attribution.

For the L2P table corresponding to each of the namespaces having the clear attribution, the restoring processing module 24 omits the execution of the shutdown preparation operation. In other words, when the controller 4 receives a power loss advance notification from the host 2, the restoring processing module 24 does not write, to the NAND flash memory 5, the updated address translation data in the DRAM 6 that has not yet been reflected in the L2P table stored in the NAND flash memory 5. When the power supply circuit 7 has the PLP function, even when the controller 4 detects that an unexpected power loss has occurred, the restoring processing module 24 omits the shutdown preparation operation with respect to the L2P table corresponding to the namespace having the clear attribution.

As above, by omitting the execution of the shutdown preparation operation with respect to L2P table corresponding to each namespace having the clear attribution, the amount of writing to the NAND flash memory 5 can be reduced compared to a structure in which the shutdown preparation operation is executed for all L2P tables corresponding to all namespaces.

When the unexpected power loss occurs, the shutdown preparation operation with respect to the L2P table corresponding to each namespace having the non-cleared attribution may be not executed normally, and thus the latest contents of the L2P table corresponding to each namespace having the non-cleared attribution may be lost. In this case, after the external power is supplied to the SSD 3 again after the unexpected power loss occurs, the restoring processing module 24 executes the restore operation to restore the L2P table corresponding to each of the namespaces having the non-clear attribution. The restoring processing module 24 does not perform the restore operation to restore the L2P table corresponding to each of the namespaces having the clear attribution. The details of the restore operation will be described below with reference to FIGS. 9A and 9B.

Also, while the SSD 3 is in on state (D0 state), the restoring processing module 24 only performs the restore preparation operation for the L2P table corresponding to each of the namespaces with the non-clear attribution, and does not perform the restore preparation operation for the L2P table corresponding to each of the namespaces with the clear attribution.

In the restore preparation operation for the L2P table corresponding to the namespace having the non-clear attribution, the restoring processing module 24 performs the following operation.

That is, the restoring processing module 24 performs (1) an operation of writing, at each checkpoint, updated address translation data in the DRAM 6 that has not yet been reflected in the L2P table stored in the NAND flash memory 5, to the NAND flash memory 5; and (2) an operation of writing, at each checkpoint, a sequence number assigned to a block currently allocated as a write destination block for the namespace, to the NAND flash memory 5 as information to identify the group of blocks to be used for the restoration operation of the L2P table for this namespace. The details of the restore preparation operation will be described later with reference to FIGS. 9A and 9B.

For the L2P table corresponding to the namespace having the clear attribution, the restoring processing module 24 does not perform the restore preparation operation.

That is, for the L2P table corresponding to the namespace with clear attribution, the restoring processing module 24 does not perform the restore preparation operation including: (3) an operation of writing, at each checkpoint, updated address translation data in the DRAM 6 that has not yet been reflected in the L2P table stored in the NAND flash memory 5, to the NAND flash memory 5; and (4) an operation of writing, at each checkpoint, a sequence number assigned to a block currently allocated as a write destination block for the namespace, to the NAND flash memory 5 as information to identify the group of blocks to be used for the restoration operation of the L2P table for this namespace.

As above, by omitting the execution of the restore preparation operation for the L2P table corresponding to the namespace having the clear attribution, the load on controller 4 can be reduced compared to the structure in which the restore preparation operation is executed for all L2P tables corresponding to all namespaces.

Figure 3:
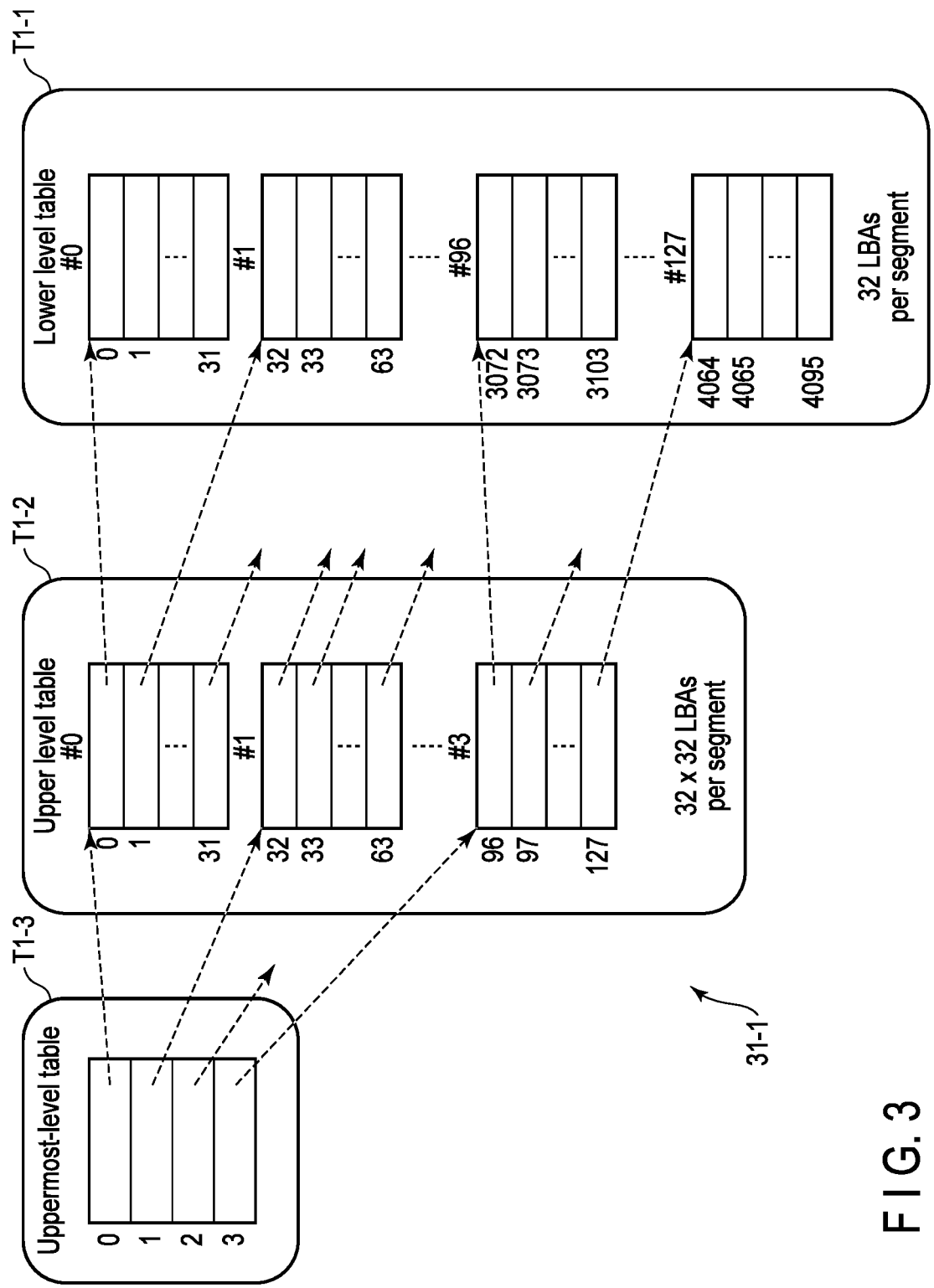
FIG. 3 is a diagram illustrating an example of a configuration of a logical-to-physical address translation table managed in the memory system according to the embodiment.

Next, an example of a configuration of the address translation table will be explained. FIG. 3 is a diagram illustrating an example of a configuration of the address translation table managed in the SSD 3 according to the embodiment.

Each of the L2P tables 31-1 to 31-$n$ can be realized as a single-level L2P table without a hierarchical structure or as a hierarchical L2P table with a hierarchical structure. In FIG.

3, it is assumed that the L2P table 31-1 corresponding to the namespace NS #1 is realized as the hierarchical L2P table.

The L2P table 31-1 that is realized as the hierarchical L2P table includes a plurality of tables corresponding to a plurality of hierarchical levels. The number of hierarchical levels may be any number of two or more, but the case where the number of hierarchical levels is three is illustrated here.

The L2P table 31-1 includes a lower level table T1-1, an upper level table T1-2, and a uppermost-level table T1-3.

The lower table T1-1 is a table for managing physical addresses in the NAND flash memory 5 where the data received from the host 2 are written. The logical address range of the namespace NS #1 is further divided into multiple ranges. Each of the multiple ranges includes a specific number of consecutive logical addresses (LBAs). For example, the lower table T1-1 includes a plurality of address translation data equal to the number of these plural ranges. In the case where the logical address range of the namespace NS #1 is divided into 128 ranges, each including 32 LBAs, the lower table T1-1 includes 128 address translation data, referred to as segments, i.e., segments #0, #1, . . . , #96, . . . , #127.

One segment of the lower table T1-1 contains 32 physical addresses corresponding to the 32 consecutive LBAs as mapping information. Each segment belonging to the lower table T1-1 is also called a lower segment. The logical address range covered by one lower segment corresponds to 32 LBAs.

The upper table T1-2 is a table for managing the physical addresses in the NAND flash memory 5 in which each lower segment is written. The upper table T1-2 also contains a plurality of address translation data referred to as segments, e.g., segments #0, #1, . . . , #3.

One segment of the upper table T1-2 indicates, for example, the 32 locations (physical storage locations) in the NAND flash memory 5 where the 32 consecutive lower segments are stored. Since each segment of the upper table T1-2 indicates the location of 32 lower segments, the total number of segments in the upper table T1-2 is ⅓₂ of the total number of lower segments. The range of logical addresses covered by one segment of the upper-level table T1-2 corresponds to 32×32 LBAs. Each segment of the upper table T1-2 may also be called an upper segment.

The uppermost-level table T1-3 contains a single address translation data, called a segment. The segment in the upper most table T1-3 indicates locations (physical storage locations) in the NAND flash memory 5 where all the upper-level segments #0, #1, . . . , #3 are stored. That is, the segment of the uppermost-level table T1-3 contains four pointers (pointers 0, 1, 2, and 3) corresponding to the upper-level segments #0, #1, . . . , and #3, respectively. Each of the four pointers indicates the location of the corresponding upper-level segment. The logical address range covered by the segment of the uppermost-level table T1-3 corresponds to 4×32×32 LBAs. The segment of the uppermost-level table T1-3 is called the uppermost-level segment or the root table.

Thus, the logical address range covered by one uppermost-level segment is wider than the logical address range covered by one upper-level table segment.

Furthermore, the logical address range covered by one upper table segment is wider than the logical address range covered by one lower table segment.

Therefore, for example, the controller 4 can set the 32×32 LBAs corresponding to the upper segment #0 to the unallocated state by merely storing a specific value indicating the unallocated state in each of the 32 entries in the upper segment #0. Furthermore, instead of storing a specific value in each of the 32 entries in the upper segment #0, the controller 4 may, for example, set the value of pointer 0 in the uppermost segment to a specific value indicating the unallocated state. In this case, the 32×32 LBAs corresponding to the upper segment #0 also can be set to the unallocated state.

In the clear operation for the namespace NS #1, the controller 4 sets, for example, four pointers in the topmost segment to specific values indicating the unallocated state. Thereby, all LBAs contained in the namespace NS #1 can be easily set to the unallocated state. Alternatively, the controller 4 may discard the uppermost-level segment itself. In this case, all the LBAs in the namespace NS #1 can be made unallocated. If the uppermost segment is discarded, the controller 4 may prepare a new uppermost segment and reallocate the prepared new uppermost segment as the uppermost-level table of the L2P table of the namespace NS #1.

Figures 4, 5, 8:
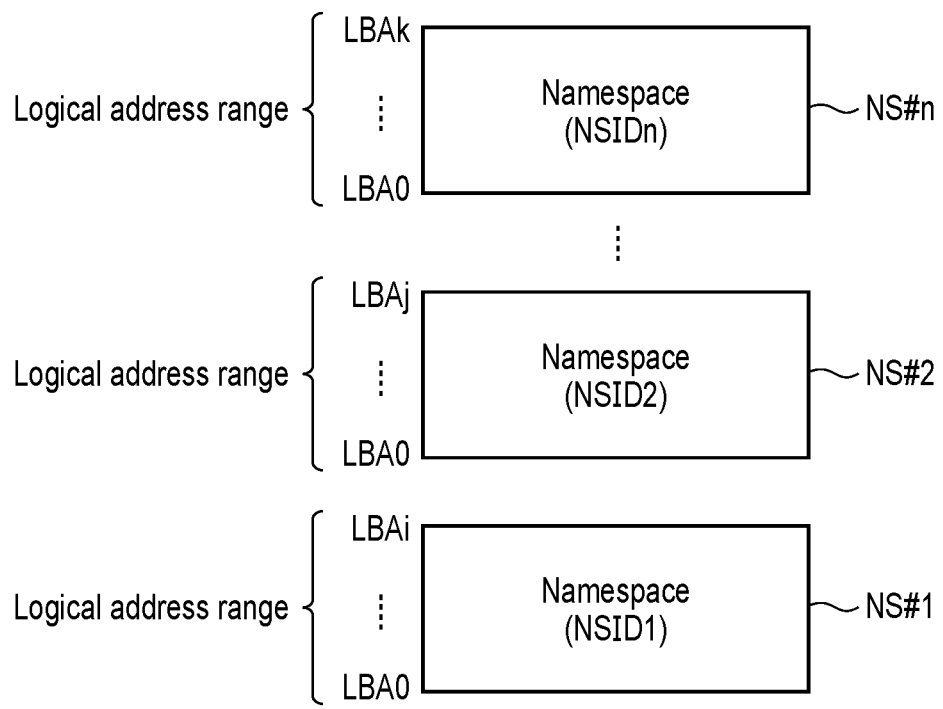
FIG. 4 is a diagram illustrating a plurality of namespaces managed in the memory system according to the embodiment.
FIG. 5 is a diagram illustrating a namespace management table managed in the memory system according to the embodiment.
FIG. 8 illustrates data to be written to a NAND flash memory included in the memory system according to the embodiment.

FIG. 4 is a diagram illustrating a plurality of namespaces managed in the SSD 3 according to the embodiment.

In FIG. 4, a case where the namespace NS #1, the namespace NS #2, . . . , and the namespace NS #n are managed by the controller 4 of the SSD 3 is illustrated. Each namespace is identified by a namespace identifier (NSID).

Each namespace contains a set of multiple continuous logical addresses (LBAs). The logical address range corresponding to each namespace starts from LBA0. Each namespace can be set to any size. The size of each namespace corresponds to the number of LBAs contained in each namespace.

In FIG. 4, the namespace NS #1 contains i+1 consecutive LBAs from LBA0 to LBAi, the namespace NS #2 contains j+1 consecutive LBAs from LBA0 to LBAj, and the namespace NS #n contains k+1 consecutive LBAs from LBA0 to LBAk.

The namespace management table 32 is used to manage the information associated with these namespaces.

FIG. 5 is a diagram illustrating the namespace management table 32 managed in the SSD 3 according to the embodiment. In the namespace management table 32, a namespace identifier of the namespace, a clear identifier of the namespace, and size of the namespace are managed as namespace information for each created name space.

The namespace identifier (NSID) of each namespace is an identifier used by the controller 4 to access each namespace. The clear identifier is an identifier that indicates whether or not the corresponding namespace has the clear attribution. The clear identifier is used as attribution information to indicate either the clear attribution or the non-clear attribution. For example, a clear identifier set to "1" indicates that the corresponding namespace has the clear attribution. On the other hand, for example, a clear identifier set to "0" indicates that the corresponding namespace has the non-clear attribution.

In FIG. 5, a case where the namespace NS #1 with the namespace identifier NSID1 and the namespace NS #n with the namespace identifier NSIDn have the clear attribution and the namespace NS #2 with the namespace identifier NSID2 does not have the clear attribution (has the non-clear attribution) is illustrated.

The size of a namespace is indicated by the number of logical addresses (LBAs) contained in the logical address range of the namespace.

Now, the block management in the SSD 3 according to the embodiment will be explained.

When the controller 4 receives a write command from the host 2, the I/O command processing module 22 determines a namespace to which data is to be written, based on the namespace identifier included in the write command. A write destination blocks that is currently allocated for each namespace is managed by using the block management table 33. As in FIG. 6, in the block management table 33, active block lists 331-1, 331-2, . . . , and 331-n corresponding to the namespaces NS #1, NS #2, . . . , and NS #n, respectively, are managed.

In each of the active block lists 331-1, 331-2, . . . , 331-n, block identifiers of active blocks are managed. The active block is a block in which valid data of the corresponding namespace is stored. In each of the active block lists 331-1, 331-2, . . . , 331-n, the block identifier of the write destination block that is currently allocated for the corresponding namespace is also managed as one of the block identifiers of the active blocks.

Valid data means data that is associated with a certain logical address. For example, data stored in a physical address that is referenced from a certain L2P table (i.e., the latest data associated with a logical address) is valid data. Valid data may be read from the host 2 later. The block in which at least one valid data is written is managed as an active block.

Invalid data means data that is not associated with any logical address. For example, data stored in a physical address that is not referenced from any L2P table is invalid data. Invalid data is no longer read from the host 2. When updated data associated with a certain logical address is written to the NAND flash memory 5, previous data associated with this logical address becomes invalid data, and the updated data becomes valid data. Furthermore, when the clear operation is executed for a certain namespace, all the valid data that are associated with the logical addresses of that namespace become invalid data.

The block identifier of each block that does not contain valid data is managed by using the free block list 332 as the block identifier of the free block.

Now, the writing to the namespace NS #2 and the management of each block allocated to the namespace NS #2 will be explained. The same process is also performed for the other namespaces.

The active block list 331-2 is a list that manages the block identifier of each active block associated with the namespace NS #2. For example, when the write command received by the controller 4 from host 2 includes the namespace identifier (NSID2) of the namespace NS #2, the I/O command processing module 22 writes the write data associated with this write command to a next writable page in the write destination block allocated to the namespace NS #2. Then, the I/O command processing module 22 updates the L2P table 31-2 associated with the namespace NS #2 such that a physical address in the NAND flash memory 5 to which the write data is written is associated with the logical address corresponding to the write data.

When no writable page exists in the write destination block when the next data is to be written to the write destination block, the I/O command processing module 22 selects any free block from the free block list 332 and allocates the selected free block as a new write destination block for the namespace NS #2.

When a new block is allocated as the write destination block for the namespace NS #2, the controller 4 assigns a sequence number to the new block. The sequence number is a number that indicates the order in which the blocks were allocated as the write destination block for the namespace NS #2.

FIG. 7 is a diagram illustrating the block use order management table 34 managed in the SSD 3 according to the embodiment.

The block use order management table 34 stores, for each namespace, the correspondence between the block identifier of each block allocated as the write destination block for that namespace and the sequence number assigned to each of these blocks.

Here, the block use order management table 341-2 associated with the namespace NS #2 will be focused. When the namespace NS #2 is created and a first write command associated with the namespace NS #2 is received, the controller 4 selects any free block (e.g., block BLK1) from the free block list 332 and allocates the block BLK1 as the write destination block for the namespace NS #2. At this time, the controller 4 assigns the sequence number 1 to the block BLK1.

After the writing of data to the block BLK1 is in progress and there are no more writable pages in the block BLK1, the controller 4 selects, for example, a block BLK3 from the free block list 332 and allocates the block BLK3 as the next write destination block for the namespace NS #2. Then, the controller 4 assigns the sequence number 2 to the block BLK3.

By repeating this operation, the controller 4 assigns the sequence number 3 to a block BLK0, which is allocated as further the next write destination block for the namespace NS #2, and assigns the sequence number 4 to a block BLK2, which is allocated as further the next write destination block after the BLK0 for the namespace NS #2.

As a result, in the block use order management table 341-2, as the block identifiers to which the sequence numbers 1, 2, 3, and 4 are assigned, BLK1, BLK3, BLK0, and BLK2 are managed.

FIG. 8 illustrates the data written to the NAND flash memory 5 included in the SSD 3 according to the embodiment.

Here, an example of data to be written to the block BLK1 will be described. In FIG. 8, each row in the block BLK1 represents a page. A top row of the block BLK1 is a page 0, next row of the block BLK1 is a page 1, and a bottom row of the block BLK1 is a page y-1.

Each page stores, for example, four data along with four logical addresses (LBAs) corresponding to these four data. Each of the four data has a size of 4 KiB. For example, the four data written to page 0 correspond to LBA16, LBA17, LBA18, and LBA20, respectively. The controller 4 can read the four data and the four LBAs corresponding to these four data from each page in the block BLK1.

Therefore, the controller 4 can know the four LBAs corresponding to the four physical addresses where these four data are written respectively. Instead of writing pairs of data and LBAs to each page, the controller 4 may write a list of LBAs corresponding to all data written to block BLK1 to a last page Py-1 of the block BLK1.

The structure of writing the LBA along with the data to each block makes it possible to restore the L2P table included in the NAND flash memory 5 by analyzing the contents of the last few blocks written, even if the updated address translation data in the DRAM 6 that is not yet reflected in the L2P table in the NAND flash memory 5 is lost due to the unexpected power loss.

Now, an example of the restore preparation operation performed by the restoring processing module 24 will be described. In this example, the restore preparation operation for the namespace NS #2 that has the non-clear attribution will be explained.

First, the operation of writing the updated address translation data in the L2P table 31-2 to the NAND flash memory 5 is explained.

Figure 9B:
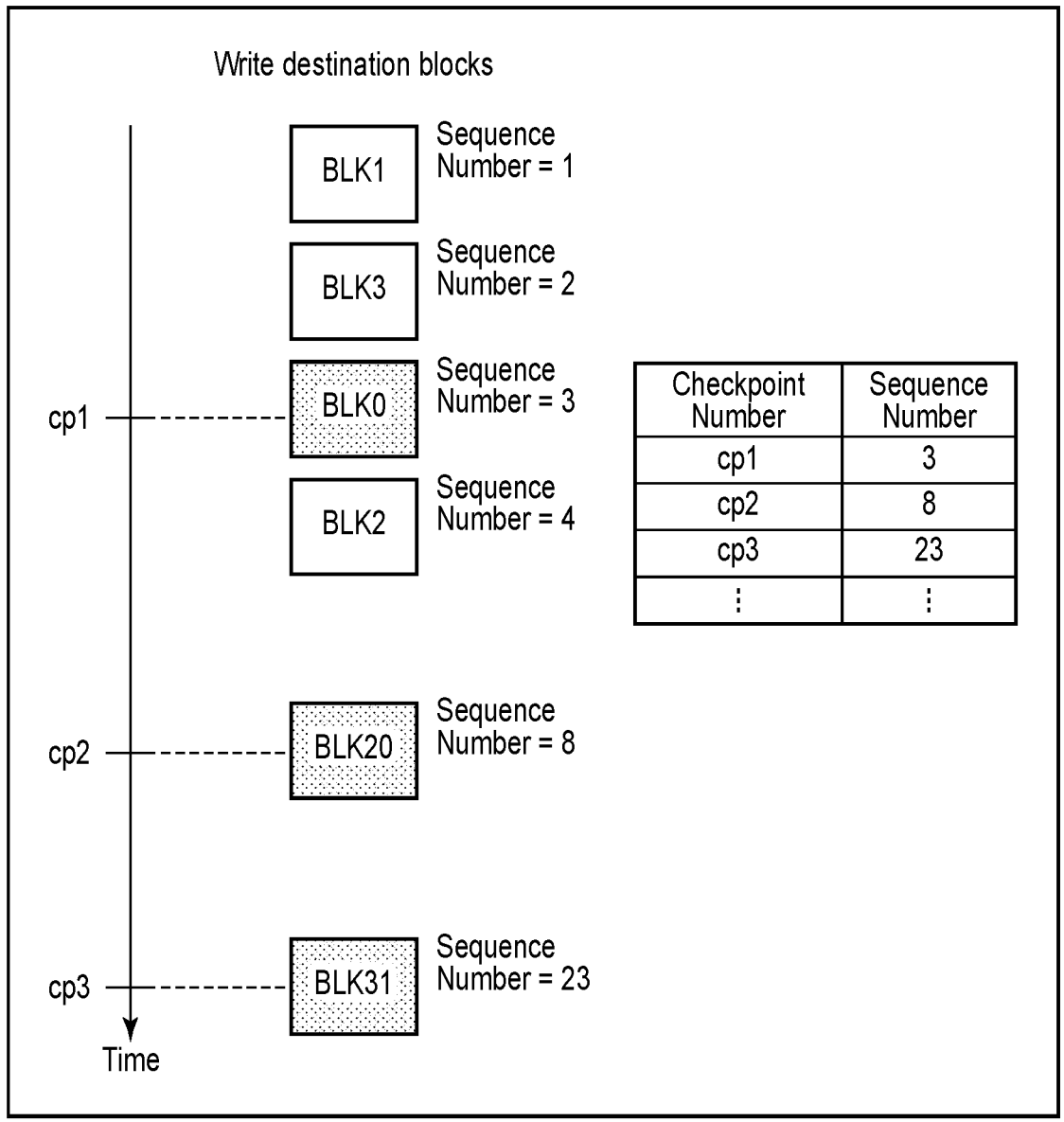
FIG. 9B is a second diagram illustrating the restore preparation operation of the logical-to-physical address translation table, which is executed in the memory system according to the embodiment.

FIG. 9A is a first diagram illustrating the restore preparation operation of the L2P table 31-2 performed in the SSD 3 according to the embodiment, and FIG. 9B is a second diagram illustrating the restore preparation operation of the L2P table 31-2 performed in the SSD 3 according to the embodiment.

The restoring processing module 24 periodically performs an operation of writing the updated address translation data of the L2P table 31-2 from the DRAM 6 to the NAND flash memory 5. The timing at which this operation is performed is referred to as a checkpoint. The cycle of the checkpoint may be at regular intervals or may be determined by a specific algorithm.

At the first checkpoint cp1, the restoring processing module 24 writes the updated address translation data in the DRAM 6 that has not yet been reflected in the L2P table 31-2 stored in the NAND flash memory 5 to the NAND flash memory 5, and thus, the contents of the updated address translation data are reflected in the L2P table 31-2 stored in the NAND flash memory 5.

In FIG. 9A, it is assumed that the address translation data corresponding to LBA 10, LBA 35, and LBA 290, respectively, have not yet been reflected in the L2P table 31-2 stored in the NAND flash memory 5. In this case, the restoring processing module 24 write the address translation data corresponding to these LBA 10, LBA 35, and LBA 290 to the NAND flash memory 5 as updated address translation data, such that the address translation data corresponding to each of these LBA 10, LBA 35, and LBA 290 is reflected in the L2P table 31-2 stored in the NAND flash memory 5.

At this time, the restoring processing module 24 writes the sequence number assigned to the block that is currently allocated as the write destination block for the namespace NS #2 to the NAND flash memory 5 as checkpoint information. As shown in FIG. 9B, at the time of checkpoint cp1, the block BLK0 is allocated as the write destination block for the namespace NS #2. Therefore, the restoring processing module 24 writes the sequence number 3 assigned to the block BLK0 to the NAND flash memory 5 as checkpoint information.

At the next checkpoint cp2, the restoring processing module 24 writes the updated address translation data in the DRAM 6 that has not yet been reflected in the L2P table 31-2 stored in the NAND flash memory 5 to the NAND flash memory 5 again, and thus the contents of the updated address translation data are reflected in the L2P table 31-2 stored in the NAND flash memory 5.

In FIG. 9A, it is assumed that the address translation data corresponding to LBA 26, LBA 34, and LBA 553, respectively, has not yet been reflected in L2P table 31-2 stored in the NAND flash memory 5. In this case, the restoring processing module 24 writes the address translation data corresponding to these LBA 26, LBA 34, and LBA 553 to the NAND flash memory 5 as updated address translation data, such that the address translation data corresponding to each of these LBA 26, LBA 34, and LBA 553 is reflected in the L2P table 31-2 stored in the NAND flash memory 5.

At this time, the restoring processing module 24 writes the sequence number assigned to the block that is currently allocated as the write destination block for the namespace NS #2 to the NAND flash memory 5 as checkpoint information. As shown in FIG. 9B, at the time of checkpoint cp2, the block BLK20 has been allocated as the write destination block for the namespace NS #2. Therefore, the restoring processing module 24 writes the sequence number 8 assigned to the block BLK20 to the NAND flash memory 5 as checkpoint information.

As shown in FIG. 9A, at the next checkpoint cp3, the restoring processing module 24 writes the address translation data corresponding to LBA 7, LBA 88, and LBA 357, respectively, to the NAND flash memory 5 as updated address translation data.

Furthermore, the restoring processing module 24 writes the sequence number assigned to the block that is currently allocated as the write destination block for the namespace NS #2 to the NAND flash memory 5 as checkpoint information. As shown in FIG. 9B, at the time of checkpoint cp3, the block BLK31 has been allocated as the write destination block for the namespace NS #2. Therefore, the restoring processing module 24 writes the sequence number 23 assigned to the block BLK31 to the NAND flash memory 5 as checkpoint information.

When the external power is supplied from host 2 to SSD 3 again after an unexpected power loss occurs, the restoring processing module 24 identifies the group of blocks to be used for the restore operation of the L2P table 31-2 based on the checkpoint information (sequence number) obtained at the last checkpoint.

For example, it is assumed that an unexpected power loss occurs immediately after the checkpoint cp1. In this case, in the restore operation of the L2P table 31-2, the restoring processing module 24 obtains from the block use order management table 341-2 the sequence number assigned to the block that is currently allocated as the write destination block for the namespace NS #2, that is, the block that is allocated as the write destination block when the unexpected power loss occurred. Then, the restoring processing module 24 identifies the group of blocks to which each sequence number belonging to the range from the sequence number 3 obtained at checkpoint cp1 to the sequence number assigned to the block that is allocated as the write destination block when the unexpected power loss occurred is assigned, as the group of blocks to be used for the restore operation of the L2P table 31-2.

For example, if an expected power loss occurs while the block BLK2 is allocated as the write destination block, the sequence number assigned to the block BLK2, which is allocated as the write destination block when the unexpected power loss occurred, is 4. Therefore, the block BLK0 with the sequence number 3 and the block BLK2 with the sequence number 4 are identified as the group of blocks to be used for the restore operation of the L2P table 31-2.

Next, the restoring processing module 24 uses the LBAs stored in each of these blocks BLK0 and BLK2 to identify the correspondence between each of the physical addresses in the blocks BLK0 and BLK2 and the LBAs corresponding to the data stored in each of these physical addresses. Then, the restoring processing module 24 restores the L2P table 31-2 stored in the NAND flash memory 5 to the latest contents using the identified correspondence between each physical address and each LBA.

FIG. 10 is a diagram illustrating an operation of creating a namespace having a clear attribution and an operation of omitting a restore preparation operation with respect to an L2P table associated with the namespace having the clear attribution.

For example, if the host 2 wishes to create a namespace to be used as a swap area, the host 2 transmits a namespace create command to the SSD 3 that specifies a clear attribution. When the controller 4 receives this namespace create command from host 2, the namespace management command processing module 21 creates a namespace having a clear attribution. The namespace management command processing module 21 manages the namespace identifier of the created namespace in association with the attribution information indicating the clear attribution by using the namespace management table 32. The controller 4 then prepares an L2P table corresponding to the created namespace. For each namespace created by the namespace management command processing module 21, the controller 4 manages the active block list by using the block management table 33, and manages the block use order by using the block use order management table 34.

When the controller 4 receives a namespace delete command from the host 2 requesting the deletion of a namespace, the namespace management command processing module 21 deletes a namespace having a namespace identifier specified by the namespace delete command.

The restore processing module 24 skips the restore preparation operation with respect to the L2P table associated with the namespace having the clear attribution. The restore preparation operation includes, at each checkpoint, writing to the NAND flash memory 5 the updated address translation data in the DRAM 6 that is not yet reflected in the L2P table stored in the NAND flash memory 5, and, at each checkpoint, writing the sequence number assigned to the block that is currently allocated as the write destination block for this namespace to the NAND flash memory 5 as information to identify the group of blocks that should be used for the restore operation of this L2P table.

FIG. 11 illustrates the clear operation performed in the SSD 3 according to the embodiment.

The clear processing module 23 performs the clear operation during the period from when the controller 4 receives a power loss advance notification from the host 2 or detects an unexpected power loss until the controller 4 becomes a ready state in which a command from the host 2 can be processed, by resupply of the external power to the SSD 3.

For example, in response to the external power being supplied to the SSD 3 again, the clear processing module 23 may perform the clear operation such that each of the logical addresses included in the namespace having the clear attribution is set to an unallocated state. In the clear operation, for example, the clear processing module 23 may set the L2P table associated with the namespace having the clear attribution to an initial state or discard the L2P table. Thus, the logical addresses included in the namespace having the clear attribution are set to the unallocated state.

Figure 12:
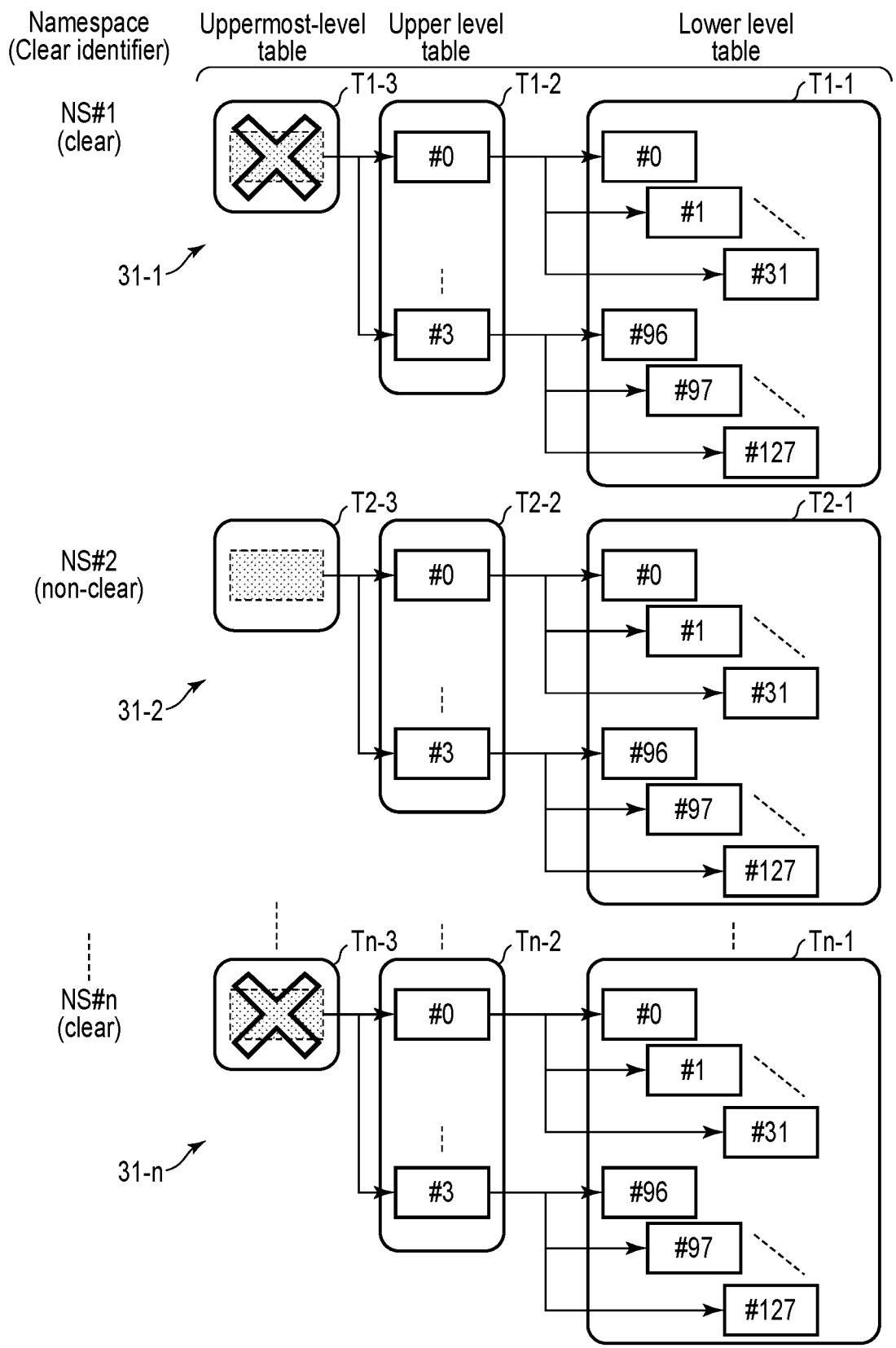
FIG. 12 is a diagram illustrating an operation of setting a logical-to-physical address translation table associated with a namespace having a clear attribution to an initial state, or discard the logical-to-physical address translation table, which is executed in the memory system according to the embodiment.

FIG. 12 is a diagram illustrating an operation of setting the logical-to-physical address translation table associated with the namespace having the clear attribution to the initial state or discarding the logical-to-physical address translation table, which is executed in the SSD 3 according to the embodiment.

In this example, it is assumed that each of the L2P table 31-1 associated with the namespace NS #1, the L2P table 31-2 associated with the namespace NS #2, . . . , and the L2P table 31-n associated with the namespace NS #n is realized as a hierarchical L2P table.

The L2P table 31-1 includes a lower level table T1-1, an upper level table T1-2, and an uppermost-level table T1-3. The L2P table 31-2 includes a lower level table T2-1, an upper level table T2-2, and an uppermost-level table T2-3. The L2P table 31-n includes a lower level table Tn-1, an upper level table Tn-2, and an uppermost-level table Tn-3.

The L2P table 31-n includes a lower level table Tn-1, an upper level table Tn-2, and an uppermost-level table Tn-3.

Note that, in FIG. 12, both the number of lower segments and the number of upper segments are shown as if they are the same among all L2P tables, but in fact, the number of lower segments and the number of upper segments included in each L2P table is determined by the size of the namespace corresponding to that L2P table.

The clear processing module 23 selects namespaces NS #1 and NS #n having the clear attribution from among namespaces NS #1 to NS #n, and executes the clear operation with respect to the namespaces NS #1 and NS #n.

First, the clear operation for the namespace NS #1 will be explained. The clear processing module 23 sets each of the logical addresses managed in the L2P table 31-1 associated with the namespace NS #1 to the unallocated state. For example, the clear processing module 23 sets the uppermost-level table T1-3 contained in the L2P table 31-1 to the initial state or discards the uppermost-level table T1-3. When the uppermost-level table T1-3 is set to the initial state or discarded, the controller 4 cannot refer to the upper level table T1-2, and also cannot refer to the lower level table T1-1.

Therefore, by setting the uppermost-level table T1-3 to the initial state or discarding it, each of the logical addresses included in the namespace NS #1 will become the unallocated state.

Similarly, the clear processing module 23 sets each of the logical addresses managed in the L2P table 31-n to the unallocated state. For example, the clear processing module 23 sets the uppermost-level table Tn-3 contained in the L2P table 31-n to the initial state or discards the uppermost-level table Tn-3. Therefore, each of the logical addresses included in the namespace NS #n becomes the unallocated state.

As a result, all of the active blocks associated with the namespace NS #1 having the clear attribution and all of the active blocks associated with the namespace NS #n having the clear attribution become blocks that store only invalid data. Therefore, the clear processing module 23 moves all the block identifiers of the active blocks associated with the namespaces NS #1 and NS #n having the clear attribution to the free block list 332.

FIG. 13 illustrates the operation of managing each of the blocks (active blocks) associated with the namespace having the clear attribution as a free block in the clear operation performed in the SSD 3 according to the embodiment.

When the clear processing module 23 sets each logical address included in the namespace NS #1 to the unallocated state, the data stored in any active block managed by the active block list 331-1 becomes invalid data. Similarly, when the clear processing module 23 sets each logical address included in the namespace NS #n to the unallocated state, the data stored in any active block managed by the active block list 331-n becomes invalid data.

Thus, in the blocks managed by the active block list 331-1, there will be no blocks in which valid data has been written. The clear processing module 23 moves the block identifiers of all the blocks managed by the active block list 331-1 to the free block list 332.

Similarly, in the blocks managed by the active block list 331-n, there will be no blocks in which valid data has been written. The clear processing module 23 moves the block identifiers of all blocks managed by the active block list 331-n to the free block list 332. As a result, each of the active blocks associated with each namespace having the clear attribution can be reused as a physical storage area available for writing data (or management information such as L2P table).

Figure 14:
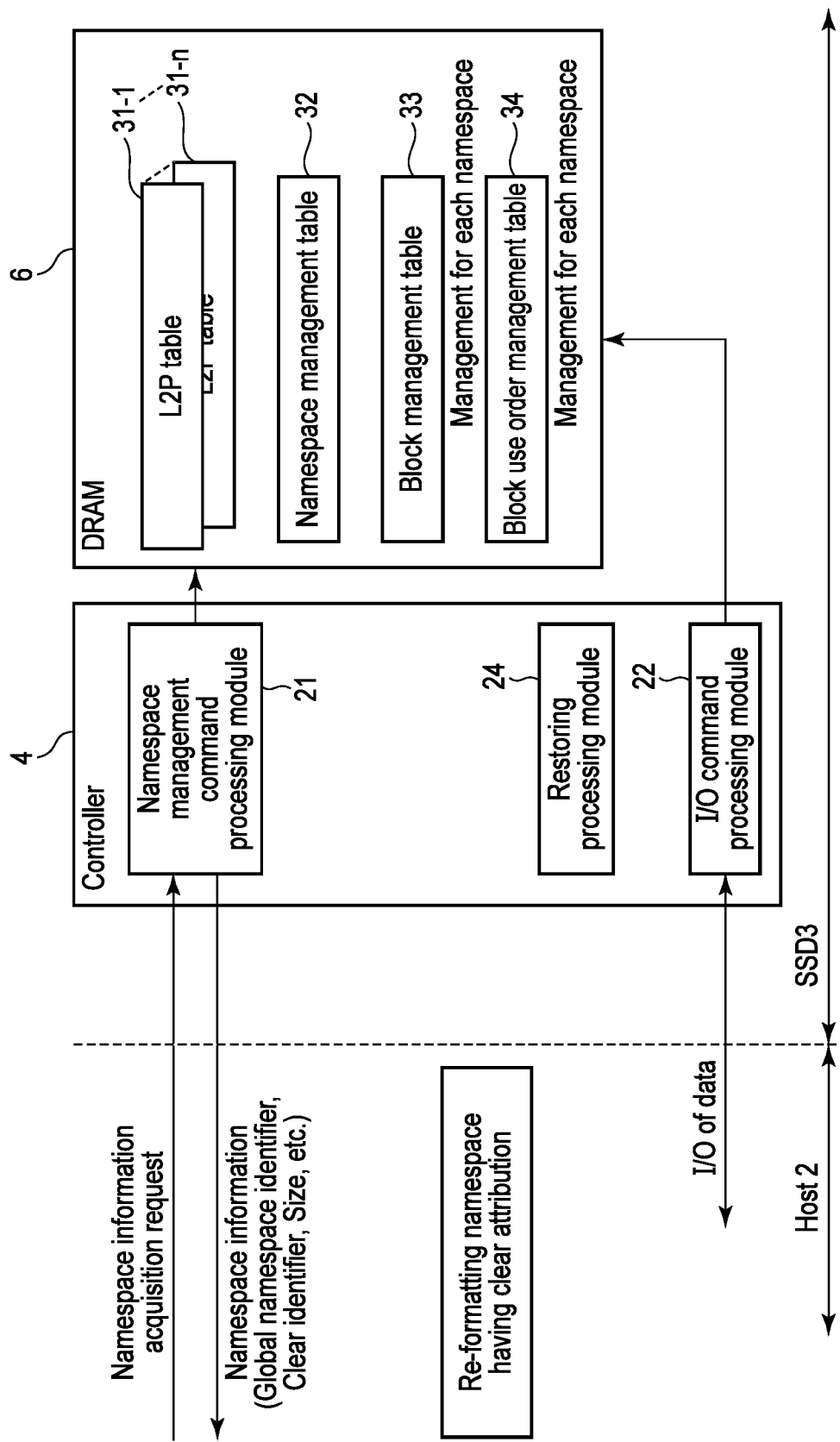
FIG. 14 is a diagram illustrating an operation of reformatting a namespace having a clear attribution, which is executed in a host.

FIG. 14 is a diagram illustrating an operation of reformatting a namespace having a clear attribution, which is executed in in the host 2.

In some LBAs around LBA0 of a namespace, information related to the format of this namespace is written, such as information indicating the type of file system corresponding to this namespace, information indicating the mount point of this namespace, and so on. When the clear operation is executed for a namespace having a clear attribution, it is no longer possible to read the format-related information from the namespace having the clear attribution. Therefore, the host 2 executes the reformatting process to re-write the format information to the namespace having the clear attribution in order to make the namespace having the clear attribution available for writing and reading data again.

After the external power is supplied to the SSD 3 again and then the controller 4 becomes the ready state, the host 2 may first obtain information about individual namespaces managed by the SSD 3 from the SSD 3, and then identify namespaces having the clear attribution among the namespaces managed by the SSD 3.

In this case, the host 2 transmits, to the controller 4, a namespace information acquisition request that specifies the NSID of a specific namespace. For example, the identify command (Identify Namespace data structure) defined in the NVMe standard can be used as the namespace information acquisition request.

When receiving the namespace information acquisition request, the namespace management command processing module 21 transmits the namespace information related to the namespace having the specified NSID to the host 2. This namespace information includes information about the namespace having the specified NSID, such as the global namespace identifier to uniquely identify this namespace, the clear identifier that is the attribution information of this namespace, the size of this namespace, etc. For example, a Namespace Globally Unique Identifier (NGUID) may be used as the global namespace identifier. A storage device that conforms to NVMe standard may contain multiple controllers. NGUID is an identifier that can uniquely identify an individual namespace managed in the storage device that conforms to NVMe standard.

When the host 2 confirms that this namespace is a namespace having the clear attribution, the host 2 instructs the SSD 3 to perform a formatting operation, thereby performing a reformatting for this namespace. By performing this reformatting of the namespace, information about the formatting of this namespace can be re-written into some of the LBAs around LBA0 of this namespace. This allows the host 2 to start using this namespace having the clear attribution again, for example, as a swap area.

After completing the reformatting process for all namespaces having the clear attributes, the host 2 issues I/O commands (write and read commands) to the SSD 3 and cooperates with the SSD 3 to write data to and read data from each namespace.

FIG. 15 is a flowchart illustrating the procedure for the namespace creation operation performed in the SSD 3 according to the embodiment.

First, the controller 4 receives a namespace create command from host 2 (step S101). The namespace create command is a namespace management command that requests the creation of a namespace. The namespace create command specifies the size of the namespace to be created and the attribution (clear attribution or non-clear attribution) of the namespace to be created.

The controller 4 determines whether or not the namespace create command received in step S101 specifies the clear attribution (step S102).

When the received namespace create command specifies the clear attribution (Yes in step S103), the controller 4 creates a namespace having the clear attribution (step S103). In step S103, the controller 4 manages the namespace identifier of the namespace created in step S103 in association with attribution information indicating the clear attribution by using the namespace management table 32.

When the received namespace create command does not specify the clear attribution (i.e., specifies the non-clear attribution) (No in step S103), the controller 4 creates a namespace having the non-clear attribution (step S104). The controller 4 manages the namespace identifier of the namespace created in step S104 in association with the attribution information indicating the non-clear attribution by using the namespace management table 32.

The controller 4 transmits the namespace information regarding the namespace created in step S103 or step S104 to the host 2 (step S105). Here, the namespace information that controller 4 transmits to the host 2 includes, at least, the namespace identifier of the namespace that has been created. The namespace information may include the namespace identifier of the created namespace, the size of the created namespace, and the attribution information indicating the attribution (clear attribution or non-clear attribution) of the created namespace.

FIG. 16 is a flowchart illustrating a procedure of a restore preparation operation executed in the SSD 3 according to the embodiment.

The controller 4 selects, one by one, the multiple L2P tables corresponding to the multiple namespaces managed by the controller 4 as the L2P tables to be used in the restore preparation operation, and performs the following operation for each selected L2P table.

The controller 4 first selects one L2P table to be subject to the restore preparation operation (step S201). The controller 4 determines whether the namespace associated with the L2P table selected in step S201 has the clear attribution or not (step S202).

When the namespace associated with the selected L2P table has the clear attribution (Yes in step S202), the controller 4 terminates the restore preparation operation. This is because there is no need to perform the restore process for the L2P table associated with the namespace that has the clear attribution.

When the namespace associated with the selected L2P table does not have the clear attribution (has the non-clear attribution) (No in step S202), the controller 4 will perform the restore preparation operation for the selected L2P table at each checkpoint. Here, it is assumed that the selected L2P table is the L2P table 31-2 associated with the namespace NS #2.

When the checkpoint timing is reached, the controller 4 first writes, to NAND flash memory 5, the updated address translation data, which is included in the address conversion data of the selected L2P table 31-2 stored in the DRAM 6 and has not yet been reflected in the L2P table 31 stored in the NAND flash memory 5 (step S203).

Then, the controller 4 writes the sequence number assigned to the block currently allocated as the write destination block for the namespace NS #2 to the NAND flash memory 5 as checkpoint information to identify the group of blocks to be used for restoring the L2P table 31-2 stored in the NAND flash memory 5 (step S204). In step S204, the controller 4 performs an operation of recording this sequence number as checkpoint information in the NAND flash memory 5, for example, together with the checkpoint number for identifying the current checkpoint.

FIG. 17 is a flowchart illustrating a procedure of an operation executed in the SSD 3 according to the embodiment, during a period from a time when receiving a power loss advance notification from the host 2 until a time when the controller 4 becomes a ready state by resupply of a power to the SSD 3.

In this example, it is assumed that the clear operation is executed after the external power is supplied to the SSD 3 again.

The controller 4 receives a power loss advance notification or a suspend instruction from the host 2 (step S301). The controller 4 determines whether the notification/instruction received in step S301 is a power loss advance notification or suspend instruction, i.e., whether an operation to be executed is the shutdown preparation operation or the suspend preparation operation (step S302).

When the notification/instruction received in step S301 is the power loss advance notification (shutdown in step S302), the controller 4 executes the shutdown preparation operation (step S303). In the shutdown preparation operation, the controller 4 executes the operation of selecting the L2P table associated with the namespace having the non-clear attribution and writing the updated address translation data to the NAND flash memory 5.

When the shutdown preparation operation is completed, the controller 4 notifies the host 2 that the shutdown preparation operation has been completed (step S304). When the host 2 confirms that the shutdown preparation operation of the SSD 3 has been completed, the host 2 turned off the supply of the external power to the SSD 3.

When the external power is supplied to the SSD 3 from the host 2 again after the supply of the external power to the SSD 3 is turned off (power on in step S305), the controller 4 starts an initialization sequence for setting a state of the controller 4 to the ready state in which a command from the host 2 can be processed by the controller 4. During this initialization sequence, the controller 4 executes the clear operation for the namespace having the clear attribution (step S306). In step S306, the controller 4 sets each logical address in the logical address range of the namespace having the clear attribution to the unallocated state, and also moves the block identifier of each block associated with the namespace having the clear attribution to the free block list 332.

Furthermore, during this initialization sequence, the controller 4 loads at least a part of the address translation data of each of the L2P tables 31-1, . . . , 31-n from the NAND flash memory 5 into the DRAM 6. For example, when the L2P table 31-1 associated with the namespace NS #1 having the clear attribution is discarded, a new L2P table for the namespace NS #1 is prepared, and at least a part of the address translation data of the prepared L2P table is loaded into the DRAM 6.

When the initialization sequence is completed, the controller 4 becomes the ready state in which a command from the host 2 can be processed. The controller 4 notifies the host 2 that the controller 4 becomes the ready state (step S310).

When the notification/instruction received in step S301 is the suspend instruction (suspend in step S302), the controller 4 executes the suspend preparation operation (step S307). In the suspend preparation operation, for each of the L2P tables corresponding to all namespaces, the controller 4 executes an operation of writing the updated address translation data stored in the DRAM 6 to the NAND flash memory 5. Then, the controller 4 executes an operation to transition the current power state of the SSD 3 from the on state (D0 state) to the low power state (D1 state, D2 state, or D3 state) specified in the suspend instruction.

When the suspend preparation operation is completed, the controller 4 notifies the host 2 that the suspend preparation operation has been completed (step S308). When the power state of the transition destination specified in the suspend instruction is the D3 state, the host 2 turns off the supply of power to the SSD 3 when the host 2 confirms that the suspend preparation operation of the SSD 3 has been completed.

When a resume instruction is received from the host 2 after the power state of the SSD 3 has transitioned to the low power state (step S309), the controller 4 begins processing to restore the power state of the SSD 3 from the low power state to the on state (D0 state). In the case where the SSD 3 is in the D3 state, a power may be supplied to the SSD 3 from the host 2 and the resume instruction may be transmitted to the SSD 3 from the host 2.

When the power state of the SSD 3 returns from the low power state to the on state (D0 state) and the controller 4 becomes the ready state in which a command from host 2 can be processed, the controller 4 notifies the host 2 that the controller 4 becomes the ready state (step S310).

FIG. 18 is a flowchart illustrating a procedure of an operation executed in the SSD 3 according to the embodiment, during a period from a time when detecting of an unexpected power loss until a time when the controller 4 becomes the ready state by resupply of a power to the SSD 3.

In this example, it is assumed that the clear operation is executed after the external power is supplied to the SSD 3 again. In a case where the power supply circuit 7 has the PLP function, the shutdown preparation operation described with reference to FIG. 17 is also executed when an unexpected power loss occurs. In a case where the power supply circuit 7 does not have the PLP function, the shutdown preparation operation is not executed when an unexpected power loss occurs. In the following, the case where the power supply circuit 7 does not have the PLP function will be explained.

When the controller 4 receives a power off detection notification from the power supply circuit 7 before receiving a power loss advance notification from the host 2, the controller 4 detects that an unexpected power loss has occurred (step S401).

When the external power is supplied to the SSD 3 from the host 2 again after the supply of the external power to the SSD 3 is turned off due to the unexpected power loss (power on in step S402), the controller 4 starts the initialization sequence. During this initialization sequence, the controller 4 executes the clear operation for the namespace having the clear attribution (step S403). In step S403, the controller 4 sets each of the logical addresses included in the namespace having the clear attribution to the unassigned state, and furthermore, moves the active blocks associated with the namespace having the clear attribution to the free block list 332.

During the initialization sequence, the controller 4 further performs the operation of restoring the L2P table associated with each namespace having the non-clear attribution (step S404). Since the L2P table associated with the namespace having the clear attribution has been set to the initial state or discarded, the controller 4 performs the restore operation only for the L2P table associated with each namespace having the non-clear attribution.

Furthermore, during this initialization sequence, the controller 4 loads at least a part of the address translation data of each of the L2P tables 31-1, . . . , 31-n from the NAND flash memory 5 into the DRAM 6. For example, when the L2P table 31-1 associated with the namespace NS #1 having the clear attribution is discarded, a new L2P table for the namespace NS #1 is prepared, and at least a part of the address translation data of the prepared L2P table is loaded into the DRAM 6.

After the initialization sequence is completed, the controller 4 becomes the ready state in which a command from the host 2 can be processed. The controller 4 notifies the host 2 that the controller 4 becomes the ready state (step S405).

Figure 19:
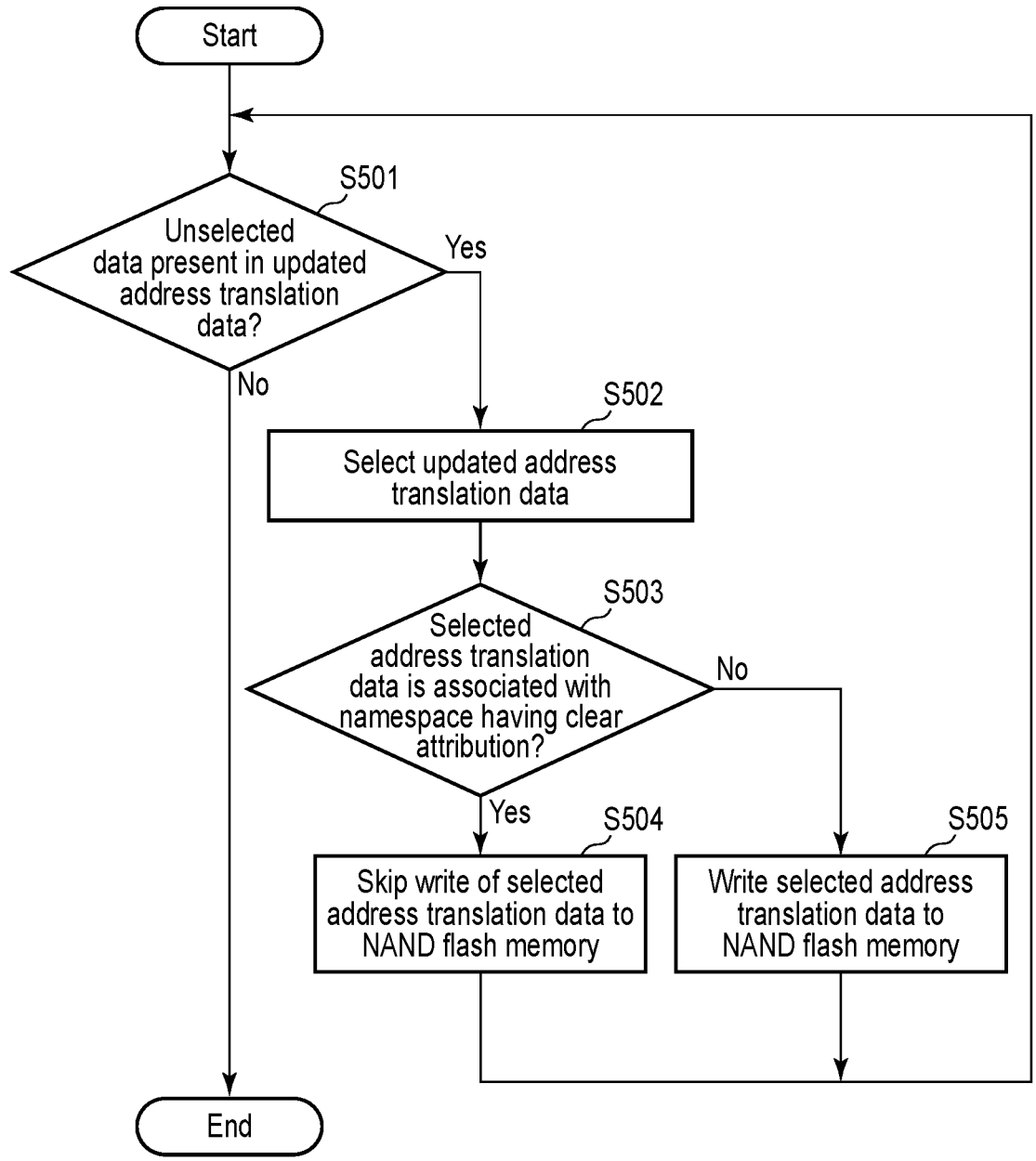
FIG. 19 is a flowchart illustrating a procedure of a shutdown preparation operation executed in the memory system according to the embodiment.

FIG. 19 is a flowchart illustrating a procedure of a shutdown preparation operation executed in the SSD 3 according to the embodiment.

When receiving a power loss advance notification from the host 2, the controller 4 starts the shutdown preparation operation. In a case where the power supply circuit 7 has the PLP function, the controller 4 will also start the shutdown preparation operation when the controller 4 detects that an unexpected power loss has occurred.

In the shutdown preparation operation, the controller 4 first determines whether or not there is updated address translation data in the DRAM 6 and whether or not there is unselected address translation data in the updated address translation data that has not yet been processed in steps S502 to S505 (step S501). If there is unselected address translation data in the updated address translation data (Yes in step S501), the controller 4 selects the address translation data that has not yet been selected among the updated address translation data stored in the DRAM 6 (step S502). When the updated address translation data does not exist in the DRAM 6, or when the process of step S502 to step S505 has been applied to all the updated address translation data and there is no more unselected address translation data (No in step S501), the process of FIG. 19 is terminated.

In step S502, the controller 4 selects any address translation data that has not yet been selected, from the updated address translation data stored in the DRAM 6 that is not yet reflected in the L2P tables 31-1, . . . , 31-n stored in the NAND flash memory 5.

The controller 4 determines whether or not the address translation data selected in step S502 is associated with a namespace that has the clear attribution (step S503). That is, the controller 4 determines whether or not the namespace associated with the L2P table that contains the selected address translation data has the clear attribution.

When the address translation data selected in step S502 is associated with a namespace having the clear attribution (Yes in step S503), the controller 4 skips the execution of the operation of writing the selected address translation data to the NAND flash memory 5 (step S504).

When the address translation data selected in step S502 is associated with a namespace having the non-clear attribution (No in step S503), the controller 4 writes the selected address translation data to the NAND flash memory 5 (step S505). As a result, the content of the selected address translation data is reflected in the L2P table in the NAND flash memory 5, which corresponds to this selected address translation data.

After step S504 or step S505, the process returns to step S501. In step S501, the controller 4 again determines whether or not there is any unselected address translation data in the updated address translation data in the DRAM 6.

When there is any unselected address translation data in the updated address translation data in the DRAM 6 (Yes in step S501), the controller 4 executes the process of steps S502 to S505 again.

When there are no more unselected address translation data in the updated address translation data in the DRAM 6 (No in step S501), the controller 4 terminates the process.

FIG. 20 is a flowchart illustrating a procedure of a suspend preparation operation executed in the SSD 3 according to the embodiment.

When receiving the suspend instruction from the host 2, the controller 4 starts the suspend preparation operation.

In the suspend preparation operation, the controller 4 first determines whether or not there is updated address translation data in the DRAM 6 and whether or not there is unselected address translation data in the updated address translation data that has not yet been processed in step S602 to step S603 (step S601). When the unselected address translation data exists in the updated address translation data (Yes in step S601), the controller 4 selects the address translation data that has not yet been selected among the updated address translation data in the DRAM 6 (step S602). When updated address translation data does not exist in the DRAM 6, or when the process of step S602 to step S603 has been applied to all the updated address translation data and there is no more unselected address translation data (No in step S601), the process of FIG. 20 is terminated.

In step S602, the controller 4 selects any address translation data that has not yet been selected from the updated address translation data in the DRAM 6 that is not yet reflected in L2P tables 31-1, . . . , 31-n stored in the NAND flash memory 5.

The controller 4 writes the address translation data selected in step S602 to the NAND flash memory 5 (step S603). As a result, the content of the selected address translation data is reflected in the L2P table in the NAND flash memory 5, which corresponds to this selected address translation data.

After step S603, the process returns to step S601. In step S601, the controller 4 again determines whether or not there is any unselected address translation data in the updated address translation data in the DRAM 6.

When there is still unselected address translation data in the updated address translation data in the DRAM 6 (Yes in step S601), that is, when there is still updated address translation data in the DRAM 6 that is not yet reflected in the L2P tables 31-1, . . . , 31-n stored in the NAND flash memory 5, the controller 4 executes the process of steps S602 to S603 again.

When there is no more unselected address translation data among the updated address translation data in the DRAM 6 (No in step S601), that is, when there is no updated address translation data remaining in the DRAM 6 that has not yet been reflected in L2P tables 31-1, . . . , 31-n stored in the NAND flash memory 5, the controller 4 terminates the process.

FIG. 21 is a flowchart illustrating a procedure of a clear operation executed in the SSD 3 according to the embodiment.

The controller 4 determines whether or not a namespace having the clear attribution exists by referring to the namespace management table 32 (step S701).

When the namespace having the clear attribution exists (Yes in step S701), the controller 4 sets each logical address in the logical address range included in the namespace having the clear attribution to the unassigned state by, for example, setting the L2P table associated with the namespace having the clear attribution to the initial state or discarding it (step S702). In a case where the L2P table associated with the namespace having the clear attribution is realized by a hierarchical L2P table, in step S702, the controller 4 sets the uppermost-level table of the hierarchical L2P table to the initial state or discards the uppermost-level table.

The controller 4 then moves the block identifiers of all blocks which are associated with the namespace having the clear attribution to the free block list 332, and manages all these blocks as free blocks (step S703).

When there is no namespace having the clear attribution (No in step S701), the controller 4 ends the clear operation.

FIG. 22 is a flowchart illustrating a procedure of an operation executed by the SSD 3 and the host 2 after an external power is supplied to the SSD 3 again.

When the external power is supplied to the SSD 3 again after the supply of the external power to the SSD 3 has been turned off, the controller 4 of the SSD 3 starts an initialization process that includes a clear operation (step S801). During the initialization process, the controller 4 also executes an operation loading at least a part of the address translation data of each of the L2P tables 31-1 to 31-n of the NAND flash memory 5 into the DRAM 6.

When the controller 4 becomes the ready state, the controller 4 notifies the host 2 that the controller 4 becomes the ready state (S802). When the controller 4 notifies the host 2 that the controller 4 becomes the ready state, the host 2 transmits to the controller 4 a namespace information acquisition request specifying the NSID of a specific namespace (step S803). After receiving the namespace information acquisition request from the host 2, the controller 4 transmits namespace information about the namespace having the specified NSID to the host 2 (step S804). The namespace information includes the global namespace identifier to uniquely identify this namespace, the clear identifier which is the attribution information of this namespace, the size of this namespace, and so on.

When the host 2 confirms that this namespace is a namespace having the clear attribution, the host 2 executes the reformatting process to write the information about the format of this namespace to some LBAs around LBA0 of this namespace (step S805). Thus, normal execution of access to this namespace in which the clear operation has already been executed becomes possible.

As explained above, according to the embodiment, when the controller 4 receives, from the host 2, a namespace create command includes a parameter that specifies whether an attribution of a namespace to be created is a clear attribution or a non-clear attribution, the controller 4 creates a namespace having a clear attribution or a namespace having a non-clear attribution according to the parameter of the command. In response to receiving a write command from the host 2 specifying a namespace identifier that identifies the namespace having the clear attribution or a namespace identifier that identifies the namespace having the non-clear attribution, the controller 4 performs an operation of writing data associated with the received write command to the NAND flash memory 5. In addition, the controller 4 performs an operation of updating an L2P table corresponding to the namespace with this clear attribution such that a physical address of the NAND flash memory 5 to which this data is written is mapped to a logical address corresponding to this data.

Then, during a period from a time when receiving a power loss advance notification or when detecting an unexpected power loss until a time when the controller 4 becomes a ready state by resupply of the external power to the SSD 3, the controller 4 performs the clear operation for the namespace having the clear attribution. That is, the controller 4 sets each of the logical addresses in the logical address range of the namespace having the clear attribution to an unallocated state in which a physical address of NAND flash memory 5 is not mapped. As a result, all data associated with the logical address range included in the namespace having the clear attribution become invalid data. Therefore, the namespace having the clear attribution will be in the same state as the namespace immediately after its creation in which no data has been written yet. Therefore, all the blocks associated with the namespace having the clear attribution become free blocks that do not contain any valid data. On the other hand, the controller 4 does not perform the clear operation for the namespace having the non-clear attribution.

Therefore, for example, by using the namespace having the clear attribute as a storage destination for data that does not need to be retained across power cycles of the SSD 3, the physical storage area in the NAND flash memory 5 can be prevented from being unnecessary used by data that does not need to be retained across power cycles of the SSD. Thus, the wear of the NAND flash memory 5 can be reduced.

Furthermore, when the controller 4 receives the power loss advance notification from the host 2, for the L2P table corresponding to the namespace having the clear attribution, the controller 4 does not perform the process of writing the updated address translation data stored in the DRAM 6 to the NAND flash memory 5. In this manner, by omitting the process to keep the L2P table corresponding to the namespace having the clear attribution to the newest contents, the amount of writing to the NAND flash memory 5 can be reduced, thus further reducing unnecessary consumption of the NAND flash memory 5. As a result, unnecessary wear of the NAND flash memory 5 can be further reduced.

While the SSD 3 is in the on state (D0 state), the controller 4 also omits the execution of the restore preparation operation for the L2P table corresponding to the namespace having the clear attribution.

As can be understood from the above, in the embodiment, various processes are omitted for the address translation data in the L2P table associated with the namespace having the clear attribution, thereby reducing the load on the controller 4 and the wear of the NAND flash memory 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system which is connectable to a host, comprising:
   a nonvolatile memory; and
   a controller electrically connected to the nonvolatile memory, wherein
   the controller is configured to:
   in response to receiving, from the host, a first namespace create command specifying a clear attribution for a first namespace, create the first namespace having the clear attribution and a first logical address range, the first logical address range including logical addresses; and according to the specified clear attribution of the first namespace create command, set the logical addresses of the first logical address range of the first namespace to an unallocated state in which a physical address of the nonvolatile memory is not mapped, during a first period from a time when receiving a power loss advance notification from the host or when detecting an unexpected power loss of the memory system until a time when the controller becomes a ready state by resupply of a power to the memory system, wherein the power loss advance notification is a notification notifying that supply of a power to the memory system will be turned off, the ready state is a state in which a command from the host can be processed by the controller.

2. The memory system of claim 1, wherein
the clear attribution indicates unnecessity of retaining data associated with the first logical address range of the first namespace across power cycles of the memory system.

3. The memory system of claim 1, wherein
the controller is further configured to manage a first namespace identifier to identify the first namespace in association with attribution information indicative of the clear attribution.

4. The memory system of claim 1, wherein
the controller is configured to set the logical addresses of the first logical address range of the first namespace to the unallocated state, during a period from a time when the power is resupplied to the memory system until a time when the controller becomes the ready state.

5. The memory system of claim 1, wherein
the controller is configured to set the logical addresses of the first logical address range of the first namespace to the unallocated state, during a period from a time when receiving the power loss advance notification from the host until a time when supply of the power to the memory system is turned off.

6. The memory system of claim 1, wherein
the controller is further configured to:
manages a first logical-to-physical address translation table for managing mapping between each of the logical addresses of the first logical address range of the first namespace and each of physical addresses of the nonvolatile memory; and
in response to receiving a first write command from the host, the first write command specifying a first namespace identifier to identify the first namespace,
 write first data associated with the first write command to the nonvolatile memory; and
 update the first logical-to-physical address translation table such that a first physical address indicative of a physical storage location in the nonvolatile memory where the first data is written is associated with a first logical address corresponding to the first data.

7. The memory system of claim 6, wherein
the controller is further configured to set the logical addresses of the first logical address range of the first namespace to the unallocated state by setting the first logical-to-physical address translation table to an initial state or discarding the first logical-to-physical address translation table.

8. The memory system of claim 6, wherein
the first logical-to-physical address translation table includes a plurality of tables corresponding to a plurality of hierarchical levels, each of the tables including one or more address translation data, and each of the one or more address translation data included in the table of each hierarchical level covering a logical address range corresponding to each hierarchical level such that address translation data corresponding to an upper hierarchical level covers a logical address range wider than that of address translation data corresponding to a lower hierarchical level, and
the controller is configured to set the logical addresses of the first logical address range of the first namespace to the unallocated state by setting the table of the uppermost hierarchical level of the hierarchical levels to an initial state or discarding the table of the uppermost hierarchical level.

9. The memory system of claim 6, further comprising a volatile memory, wherein
the controller is further configured to:
load address translation data included in the first logical-to-physical address translation table from the nonvolatile memory into the volatile memory;
in response to executing the first write command, update the address translation data stored in the volatile memory; and
when receiving the power loss advance notification from the host, set the logical addresses of the first logical address range of the first namespace to the unallocated state during the first period, without writing, to the nonvolatile memory, updated address translation data stored in the volatile memory, so as not to be reflected to the first logical-to-physical address translation table stored in the nonvolatile memory.

10. The memory system of claim 9, wherein
the controller is further configured to:
in response to receiving an instruction to transition a power state of the memory system from an on state to a low power state corresponding to a suspend state of the host, write, to the nonvolatile memory, the updated address translation data stored in the volatile memory, so as to be reflected to the first logical-to-physical address translation table stored in the nonvolatile memory.

11. The memory system of claim 9, wherein
the controller is further configured:
in response to receiving, from the host, a second namespace create command specifying a non-clear attribution for a second namespace, create the second namespace having the non-clear attribution and a second logical address range, the second logical address range including logical addresses, the non-clear attribution requiring retaining data associated with the second logical address range of the second namespace across power cycles of the memory system;
manage a second logical-to-physical address translation table to manage mapping between each of the logical addresses of the second logical address range of the second namespace and each of physical addresses of the nonvolatile memory;
load second address translation data included in the second logical-to-physical address translation table from the nonvolatile memory into the volatile memory;
in response to executing a second write command specifying a second namespace identifier to identify the second namespace, update the second address translation data stored in the volatile memory; and in response to receiving the power loss advance notification from the host, write, to the nonvolatile memory, updated second address translation data stored in the volatile memory, so as to be reflected to the second logical-to-physical address translation table stored in the nonvolatile memory.

12. The memory system of claim 9, wherein
the controller is further configured:
in response to receiving, from the host, a second namespace create command specifying a non-clear attribution for a second namespace, create the second namespace having the non-clear attribution and a second logical address range, the first logical address range including logical addresses, the non-clear attribution requiring to retaining data associated with the second logical address range of the second namespace across power cycles of the memory system;

manage a second logical-to-physical address translation table to manage mapping between each of the logical addresses of the second logical address range of the second namespace and each of physical addresses of the nonvolatile memory;

load second address translation data included in the second logical-to-physical address translation table from the nonvolatile memory to the volatile memory;

in response to executing a second write command specifying a second namespace identifier to identify the second namespace, update the second address translation data stored in the volatile memory;

execute a first restore preparation operation with respect to the second logical-to-physical address translation table, the first restore preparation operation including (1) writing, at each checkpoint, updated second address translation data stored in the volatile memory to the nonvolatile memory, the updated second address translation data being date which is not yet reflected to the second logical-to-physical address translation table stored in the nonvolatile memory, and (2) writing, at each checkpoint, a sequence number assigned to a first block which is currently allocated as a write destination block for the second namespace, to the nonvolatile memory, as information to identify a group of blocks used for a restoring operation of the second logical-to-physical address translation table stored in the nonvolatile memory; and omit execution of a second restore preparation operation with respect to the first logical-to-physical address translation table, the second restore preparation operation including (3) writing, at each checkpoint, updated first address translation data stored in the volatile memory to the nonvolatile memory, the updated first address translation data being date which is not yet reflected to the first logical-to-physical address translation table stored in the nonvolatile memory, and (4) writing, at each checkpoint, a sequence number assigned to a second block which is currently allocated as a write destination block for the first namespace, to the nonvolatile memory, as information to identify a group of blocks used for a restoring operation of the first logical-to-physical address translation table stored in the nonvolatile memory, wherein the sequence number assigned to the first block indicates an order of assignment of the first block as the write destination block for the second namespace, and the sequence number assigned to the second block indicates an order of assignment of the second block as the write destination block for the first namespace.

13. A method of controlling a memory system that includes a nonvolatile memory and a controller, the method comprising:
in response to receiving, from a host, a first namespace create command specifying a clear attribution for a first namespace, creating the first namespace having the clear attribution and a first logical address range, the first logical address range including logical addresses; and according to the specified clear attribution of the first namespace create command, setting the logical addresses of the first logical address range of the first namespace to an unallocated state in which a physical address of the nonvolatile memory is not mapped, during a first period from a time when receiving a power loss advance notification from the host or when detecting an unexpected power loss of the memory system until a time when the controller becomes a ready state by resupply of a power to the memory system, wherein the power loss advance notification is a notification notifying that supply of a power to the memory system will be turned off, the ready state is a state in which a command from the host can be processed by the controller.

14. The method of claim 13, wherein
the setting the logical addresses to the unallocated state is allowed to invalidate data associated with the logical address range of the first namespace after a supply of external power is turned off.

15. The memory system of claim 1, wherein
the setting the logical addresses to the unallocated state is allowed to invalidate data associated with the logical address range of the first namespace after a supply of external power is turned off.

* * * * *